United States Patent
Bae et al.

(10) Patent No.: US 12,185,788 B2
(45) Date of Patent: Jan. 7, 2025

(54) METHOD FOR MOLDING FOAMED MATERIAL

(71) Applicant: NIKE, Inc., Beaverton, OR (US)

(72) Inventors: Jeongeun Bae, Beaverton, OR (US); Rory S. Blanche, Portland, OR (US); Ryan Creswell, Beaverton, OR (US); William Denton, Beaverton, OR (US); Caleb W. Dyer, Beaverton, OR (US); Bryan N. Farris, North Plains, OR (US); Diego Zurita, Beaverton, GA (US); David Jung, Busan (KR); Minseung Kang, Busan (KR)

(73) Assignee: NIKE, Inc., Beaverton, OR (US)

( * ) Notice: Subject to any disclaimer, the term of this patent is extended or adjusted under 35 U.S.C. 154(b) by 292 days.

(21) Appl. No.: 17/578,583

(22) Filed: Jan. 19, 2022

(65) Prior Publication Data

US 2022/0248803 A1    Aug. 11, 2022

Related U.S. Application Data

(60) Provisional application No. 63/146,284, filed on Feb. 5, 2021.

(51) Int. Cl.
*A43B 13/18* (2006.01)
*A43B 13/04* (2006.01)
(Continued)

(52) U.S. Cl.
CPC ............ *A43B 13/187* (2013.01); *A43B 13/04* (2013.01); *B29D 35/02* (2013.01); *B29D 35/122* (2013.01);
(Continued)

(58) Field of Classification Search
CPC ......... A43B 13/187; A43B 13/04; A43B 1/14; A43B 17/14; A43B 1/0063; B29D 35/02;
(Continued)

(56) References Cited

U.S. PATENT DOCUMENTS 3,906,137 A    9/1975   Bauer
4,674,204 A    6/1987   Sullivan et al.
(Continued)

FOREIGN PATENT DOCUMENTS

CN    1069692    3/1993
CN    1295920    5/2001
(Continued)

OTHER PUBLICATIONS

International Preliminary Report on Patentability for PCT/US2019/029545 mailed Apr. 27, 2019.
(Continued)

*Primary Examiner* — S. Behrooz Ghorishi
(74) *Attorney, Agent, or Firm* — Shock, Hardy & Bacon L.L.P.

(57) ABSTRACT

Methods and systems are provided for forming a molded foam article. An example method may include molding a plurality of separate pieces of closed-cell foam by exposure to a temperature cycle within a sealed mold to soften the plurality of pieces sufficiently for physical bonding; and forming a molded foam article with the pieces bonded together without an adhesive, wherein, during the temperature cycle, the mold is unsealed at least once to release gases and/or pressure. In another example, a method includes exposing a filled, sealed mold filled with a plurality of pieces of foamed material to a heating cycle; at a threshold temperature, unsealing the filled, sealed mold until a pressure reduces to within a threshold of atmospheric pressure; and,
(Continued)

following the unsealing, cooling the filled mold prior to removing a molded foam article.

16 Claims, 9 Drawing Sheets

(51) Int. Cl.
- B29D 35/02 (2010.01)
- B29D 35/12 (2010.01)
- B29K 77/00 (2006.01)
- B29K 105/04 (2006.01)
- B29K 105/24 (2006.01)
- B29K 105/26 (2006.01)
- B29L 31/50 (2006.01)

(52) U.S. Cl.
CPC .... *B29K 2077/00* (2013.01); *B29K 2105/046* (2013.01); *B29K 2105/24* (2013.01); *B29K 2105/26* (2013.01); *B29L 2031/504* (2013.01)

(58) Field of Classification Search
CPC .... B29D 35/122; B29D 35/12; B29D 35/142; B29K 2077/00; B29K 2105/046; B29K 2105/24; B29K 2105/26; B29L 2031/504
See application file for complete search history.

(56) References Cited

U.S. PATENT DOCUMENTS

| | | | |
|---|---|---|---|
| 5,052,130 A | | 10/1991 | Barry et al. |
| 5,150,490 A | * | 9/1992 | Busch .................... A43B 17/14 36/43 |
| 5,879,780 A | | 3/1999 | Kindinger et al. |
| 7,464,428 B2 | | 12/2008 | Norton |
| 9,282,785 B2 | | 3/2016 | Grondin |
| 9,956,732 B2 | | 5/2018 | Murphy et al. |
| 9,968,157 B2 | | 5/2018 | Wardlaw et al. |
| 10,016,916 B2 | | 7/2018 | Simard et al. |
| 2010/0029796 A1 | | 2/2010 | Alderson et al. |
| 2010/0098797 A1 | | 4/2010 | Davis et al. |
| 2010/0325921 A1 | | 12/2010 | Wu |
| 2014/0068840 A1 | | 3/2014 | Nauman et al. |
| 2014/0070448 A1 | * | 3/2014 | Martin .................... B29D 30/02 264/161 |
| 2016/0192862 A1 | | 7/2016 | Merrell et al. |
| 2016/0227877 A1 | * | 8/2016 | Grondin .............. A43B 13/125 |
| 2017/0197342 A1 | | 7/2017 | Jacobs |
| 2017/0325546 A1 | | 11/2017 | Becker et al. |
| 2018/0094129 A1 | * | 4/2018 | Baghdadi .............. C08J 9/0061 |
| 2018/0168284 A1 | | 6/2018 | Robertson et al. |
| 2018/0317606 A1 | | 11/2018 | Schneider et al. |
| 2019/0291371 A1 | * | 9/2019 | Wardlaw ........... B29D 35/0063 |
| 2019/0366666 A1 | * | 12/2019 | Fakhouri ................. B29C 43/52 |

FOREIGN PATENT DOCUMENTS

| | | |
|---|---|---|
| CN | 107920623 | 4/2018 |
| EP | 2767183 A1 | 8/2014 |
| EP | 2786670 A1 | 10/2014 |
| EP | 3649881 A1 | 5/2020 |
| TW | 201509638 | 3/2015 |
| WO | 2017160874 A1 | 9/2017 |
| WO | 2019236500 A1 | 12/2019 |

OTHER PUBLICATIONS

International Preliminary Report on Patentability for PCT/US2019/029545, mailed Jul. 9, 2020.
International Search Report and Written Opinion for PCT/US2019/029545 mailed Jul. 19, 2019.
Written Opinion for PCT/US2019/029545, mailed Mar. 26, 2020.
Written Opinion of the International Searching Authority for PCT/US2019/029545 mailed Apr. 27, 2019.
International Search Report and Written Opinion for PCT/US2022/070244, mailed Apr. 25, 2022.
Tao Zhang, et al., "Compression Molding of Thermoplastic Polyurethane Foam Sheets with Beads Expanded by Supercritical CO2 Foaming", Polymers 2021, pp. 1-13, 656; https://doi.org/10.3390/polym13040656.
Written Opinion of the International Preliminary Examining Authority for PCT/US2022/070244, mailed Sep. 29, 2022.
International Preliminary Report on Patentability for PCT/US2022/070244, mailed Jan. 18, 2023.

* cited by examiner

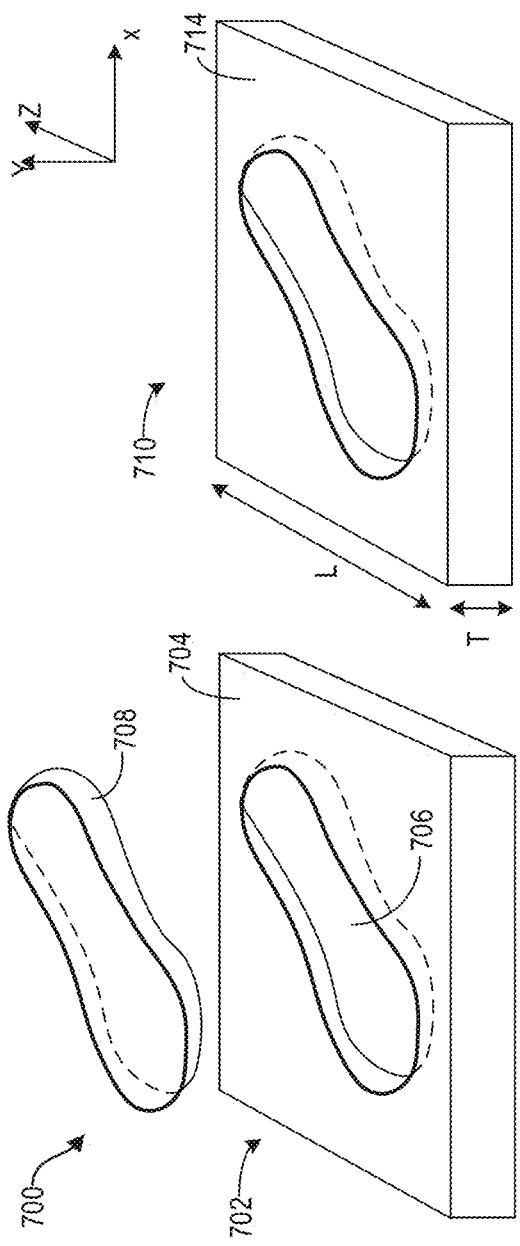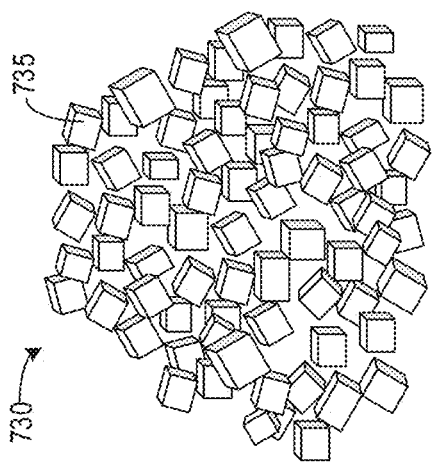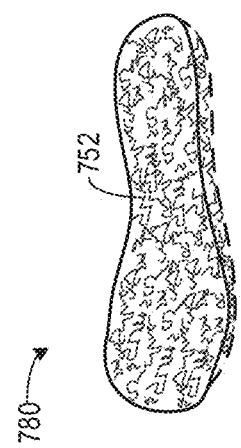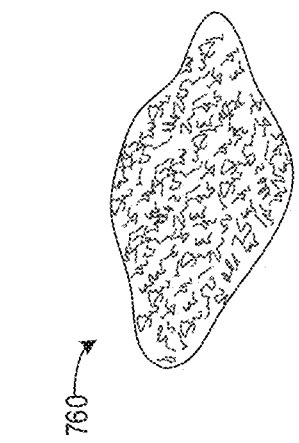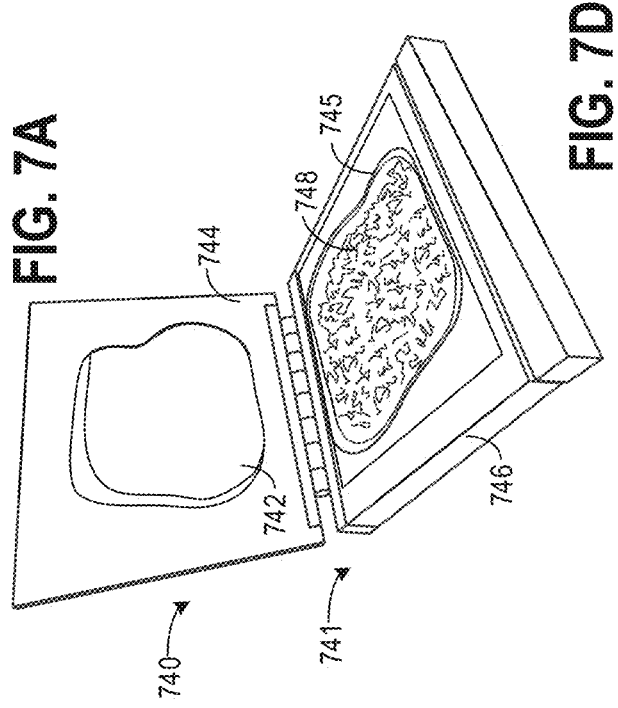
FIG. 7A
FIG. 7B
FIG. 7C
FIG. 7D
FIG. 7E
FIG. 7F

METHOD FOR MOLDING FOAMED MATERIAL

CROSS-REFERENCE TO RELATED APPLICATIONS

This application claims priority to, U.S. Patent Application entitled "Method for Molding Foamed Material," filed on Feb. 5, 2021, and assigned application No. 63/146,284, each of which are incorporated herein by reference in their entireties.

BACKGROUND

Cushioning elements may be used in various components, such as various articles worn by a user or in sports equipment. In one example, an article of footwear may use foam as a cushioning element, such as in a heel counter or a sock liner, or in the sole structure, such as in a midsole.

The cushioning element may comprise a foamed material, such as a portion of a sheet of foamed material. One method to form such articles may include forming a foam sheet, and then cutting out the cushioning element from the sheet. After the cushioning elements are cut from the foam sheet, a portion of the sheet may remain as scrap material.

BRIEF DESCRIPTION OF THE DRAWINGS

FIG. 7A shows a scrap sheet of foamed material from where an apparel component has been removed.

FIG. 7B shows a direction of cutting the scrap sheet during processing of the foamed material.

FIG. 7C shows separate pieces of the foamed material during the processing of the foamed material.

FIG. 7D shows molding of the pieces of the foamed material.

FIG. 7E shows a sheet of molded, foamed material, which in an example may be compressed, molded, foamed material.

FIG. 7F shows a footwear component prepared from the molded, foamed material.

FIGS. 1, 2, and 9 are shown approximately to scale.

DESCRIPTION

Figure 1:
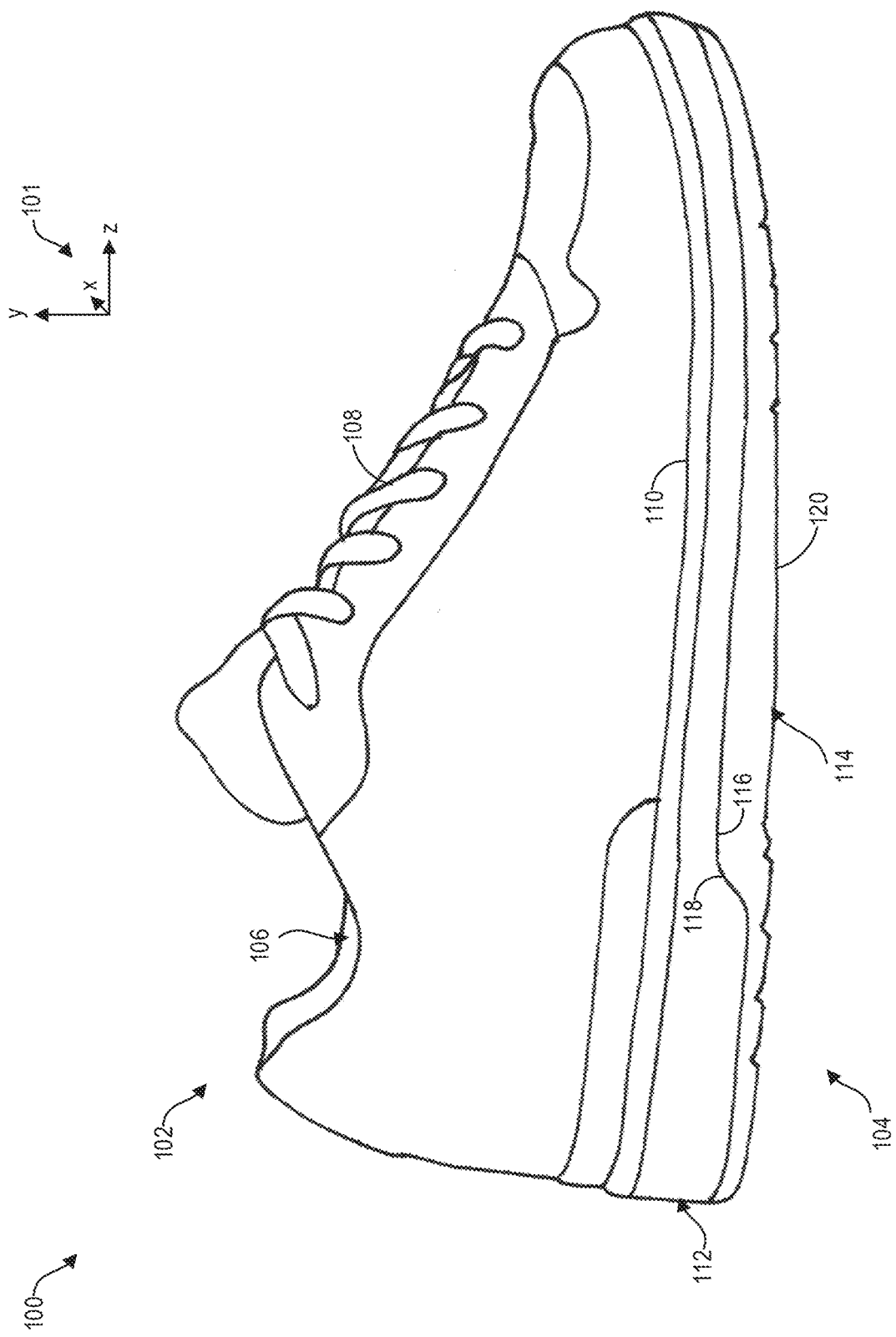
FIG. 1 shows an example of an article of footwear with an upper and a sole structure.

Various methods for forming a molded foam article are described herein. As one example, a method may include sub-dividing, such as by cutting, chopping, ripping, etc., the foamed material, which may be scrap, into a plurality of separate pieces, which may be of a selected size range. The method may include molding the plurality of separate pieces in a sealed mold with the mold being exposed to a temperature cycle. In an example, the seal surrounds one or more molds that form the article or articles, where sealing the mold includes closing the mold. During the temperature cycle, upon reaching a threshold temperature, which may be an average temperature of the foamed material in the mold, the mold is unsealed at least once, releasing pressure and/or gases, such as to atmosphere, and returning the mold cavity to a pressure toward atmospheric pressure, such as pressure being reduced from atmospheric pressure to within 30% of atmospheric pressure, from atmospheric pressure to within 10% of atmospheric pressure, or from atmospheric pressure to within 5% of atmospheric pressure. It has been found that, by releasing the pressure within the mold cavity during the molding process in this manner, the plurality of pieces of the foamed material form an improved bond together and form a molded foam article having properties suitable for use as a cushioning element.

In particular, in an aspect, the method can be used to form a single-piece molded foam article. The method includes molding a plurality of separate pieces of closed-cell foam into a single-piece molded foam article by exposing the plurality of separate pieces to a temperature cycle within a sealed mold sufficient to soften the plurality of separate pieces without fully melting the closed-cell foam. Then the plurality of separate pieces are allowed to physically bond to each other. During the temperature cycle, the sealed mold can be unsealed at least once, releasing gases and/or pressure from the mold. The single-piece molded foam article is formed by physically bonding the softened plurality of separate pieces bonded together without an adhesive, and, following the releasing, removing the single-piece molded foam article from the mold. During the temperature cycle, an average temperature among the plurality of separate pieces reaches a minimum threshold temperature at which the closed-cell foam softens sufficiently for the plurality of pieces to physically bond together without adhesive.

The molded foam article may be used for articles of cushioning in articles of apparel, footwear, and/or sporting equipment, as examples. In some cases, the plurality of pieces of foamed material used to form the molded article may be scrap foamed material from cut foamed sheets. In this way, by repurposing the scrap foamed material, in some cases without addition of any binders or additives, waste may be reduced in an environmentally responsible way while maintaining the desired properties of the molded foam article. Further, by releasing pressure from the sealed mold during the temperature cycle, it may be possible to better maintain cushioning properties while reducing regions of hardening and/or burning of the foamed material, while still retaining good adhesion between the pieces. Such an approach may also better maintain the quality of edges of the molded foam article to reduce post-processing, such as trimming of edges, etc.

For example, the following description may relate to systems and methods for molding foam, such as sub-divided pieces of foamed material, to manufacture articles, including one or more of articles of footwear, articles of athletic equipment (such as athletic padding or protective padding), articles of apparel, and/or combinations thereof. As described herein, approaches are described for recycling and re-using scrap foamed material by re-combining the scrap foamed material to form one or more of the articles described herein, in some examples without any adhesive bonding the scrap foamed material. For example, the scrap foamed material may be sub-divided and then molded in a molding process that includes a release of pressure and/or gases generated in the molding process from a sealed region of the mold. In this way, the re-combined scrap foamed material can form a unitary bonded structural layer or body that maintains some of the foam properties to a sufficient level to meet requirements for another article, such as a cushioning member. For example, the re-combined scrap foamed material can be achieved with or without reduced burning or hardening of the scrap foamed material even after the molding process.

The present disclosure will be better understood upon reading the following numbered aspects, which should not be confused with the claims. Any of the numbered aspects below can, in some instances, be combined with aspects described elsewhere in this disclosure and such combinations are intended to form part of the disclosure.

Aspect 1. A method for forming a single-piece molded foam article, comprising:
molding a plurality of separate pieces of closed-cell foam into a single-piece molded foam article by exposing the plurality of separate pieces to a temperature cycle within a sealed mold sufficient to soften the plurality of separate pieces without fully melting the closed-cell foam, and allow the plurality of separate pieces to physically bond to each other, wherein, during the temperature cycle, the sealed mold is unsealed at least once, releasing gases and/or pressure from the mold;
forming the single-piece molded foam article by physically bonding the softened plurality of separate pieces bonded together without an adhesive, and, following the releasing, removing the single-piece molded foam article from the mold.

Aspect 2. The method of aspect 1, wherein, during the temperature cycle, an average temperature among the plurality of separate pieces reaches a minimum threshold temperature at which the closed-cell foam softens sufficiently for the plurality of pieces to physically bond together without adhesive.

Aspect 3. The method of any of the above aspects, further comprising sub-dividing one or more larger pieces of the closed-cell foam, forming the plurality of separate pieces, wherein the plurality of separate pieces are smaller in size than the one or more larger pieces.

Aspect 4. The method of any of the above aspects, wherein the mold is unsealed by opening the mold, and then re-sealed upon closing the mold prior to removing the single-piece molded foam article from the mold.

Aspect 5. The method of any of the above aspects, wherein, at least upon completion of the temperature cycle, the plurality of separate pieces are touching each other without any other component therebetween.

Aspect 6. The method of any of the above aspects, wherein, during the temperature cycle, the plurality of separate pieces of closed-cell foam expand in volume.

Aspect 7. The method of any of the above aspects, wherein the sealed mold is free of an adhesive, and the plurality of separate pieces are free of the adhesive.

Aspect 8. The method of any of the above aspects, wherein more than one type of foamed material is included in the sealed mold, or a solid polymeric element is included in the mold, or both.

Aspect 9. The method of any of the above aspects, wherein opening the sealed mold includes, upon an average temperature of the plurality of separate pieces of the closed-cell foam reaching the minimum threshold temperature, stabilizing the temperature, and then opening the sealed mold, forming an unsealed mold.

Aspect 10. The method of aspect 9, further comprising holding the unsealed mold open until a pressure within the unsealed mold reduces to within a threshold of atmospheric pressure, and then closing the unsealed mold to re-seal the unsealed mold, forming a re-sealed mold, and cooling the plurality of separate pieces of the closed-cell foam in the mold to a second threshold temperature, the second threshold temperature lower than the minimum threshold temperature.

Aspect 11. The method of aspect 10, wherein the pressure reduction to within the threshold of atmospheric pressure occurs at a rate faster than a pressure rise during heating of the temperature cycle.

Aspect 12. The method of aspect 10, further comprising, upon reaching the second threshold temperature, re-opening the re-sealed mold.

Aspect 13. The method of any of aspects 10-12, wherein the minimum threshold temperature is in a range of 150° C. to 160° C. and the second threshold temperature is in a range of 20° C. to 35° C.

Aspect 14. The method of any of the above aspects, further comprising trimming the single-piece molded foam article in a shape and a size of a cushioning element of an article of footwear.

Aspect 15. The method of aspect 3, wherein the sub-dividing the one or more larger pieces of the closed-cell foam includes splitting a first sheet of the closed-cell foam to form a second sheet of the closed-cell foam, wherein a thickness of the second sheet of the closed-cell foam is at least 5% lower than a thickness of the first sheet of the closed-cell foam.

Aspect 16. The method of aspect 15, further comprising vertically cutting the second sheet of the closed-cell foam to a threshold length.

Aspect 17. The method of aspect 16, wherein the threshold length is in a range of 4 to 10 cm.

Aspect 18. The method of any one of aspects 15-17, further comprising chopping the second sheet of the closed-cell foam of the threshold length into rectangular-prism-shaped pieces.

Aspect 19. The method of any of the above aspects, further comprising filtering the plurality of separate pieces by passing them through one or more filtering meshes to separate out pieces of a first size range.

Aspect 20. The method of aspect 19, wherein the first size range is a size range of 3 mm to 15 mm.

Aspect 21. The method of any of the above aspects, further comprising, prior to or during the molding, drying the plurality of separate pieces at an elevated temperature above ambient temperature until a moisture content of the plurality of separate pieces reduces to below a threshold level.

Aspect 22. The method of any of the above aspects, wherein molding the plurality of separate pieces includes filling one or more cavities of the mold with an amount of the plurality of pieces, closing a lid of the filled mold, sealing the filled mold via a gasket, and exposing the sealed filled mold to the temperature cycle.

Aspect 23. The method of any of the above aspects, wherein an amount of the plurality of pieces in the mold is based on one or more of a volume of the molded foam article, a specific gravity of the closed-cell foam, and a desired compression ratio of the single-piece molded foam article.

Aspect 24. The method of aspect 23, wherein the desired compression ratio is based on the molded foam article, the desired compression ratio ranging from 150% to 250%.

Aspect 25. The method of any of the above aspects wherein the closed-cell foam is a scrap foam remaining after forming another foam article different from the single-piece molded foam article.

Aspect 26. The method of any of the above aspects, wherein the single-piece molded foam article is a cushioning element.

Aspect 27. The method of aspect 26, wherein the cushioning element is a cushioning element for an article of apparel, footwear, or sporting equipment.

Aspect 28. The method of aspect 27, wherein the single-piece molded foam article is a component of an article of footwear.

Aspect 29. The method of aspect 28, wherein the single-piece molded foam article is a sock liner.

Aspect 30. The method of aspect 28, wherein the single-piece molded foam article is a core.

Aspect 31. The method of aspect 28, wherein the single-piece molded foam article is a midsole or a midsole component.

Aspect 32. The method of any of the above aspects, wherein the closed-cell foam is a foamed product of a polymeric resin.

Aspect 33. The method of any of the above aspects, wherein the closed-cell foam is a foamed and crosslinked product of a thermoplastic polymer resin.

Aspect 34. The method of any of the above aspects, wherein the closed-cell foam is a foamed product of a thermoplastic resin comprising a thermoplastic chosen from one of a thermoplastic polyurethane, a thermoplastic polyester, a thermoplastic polyether, a thermoplastic polyamide, a thermoplastic copolymer thereof, or a thermoplastic mixture thereof; optionally wherein the closed-cell foam is a foamed product of a thermoplastic resin comprising a thermoplastic elastomer chosen from one of a thermoplastic polyurethane elastomer, a thermoplastic polyester elastomer, a thermoplastic polyether elastomer, a thermoplastic polyamide elastomer, a thermoplastic copolymer elastomer thereof, or a mixture thereof; optionally wherein the thermoplastic elastomer comprises at least one thermoplastic copolyimide elastomer.

Aspect 35. The method of any of the above aspects, wherein the closed-cell foam comprises a cross-linked foam, optionally a cross-linked elastomeric foam.

Aspect 36. The method of any of the above aspects, wherein the closed-cell foam is a foamed product of a polymeric resin comprising a polyamide, optionally an elastomeric polyamide.

Aspect 37. The method of any of the above aspects, wherein the closed-cell foam is a foamed and crosslinked product of a polymeric resin comprising a polyamide, optionally an elastomeric polyamide.

Aspect 38. The method of any of the above aspects, wherein the closed-cell foam comprises a cross-linked polyamide.

Aspect 39. The methods of aspect 38, wherein the polyamide of the polymeric resin comprises polyamide-6, polyamide-11, polyamide 6,6, or any combination thereof.

Aspect 40. The method of aspects 38 or 39, wherein the polyamide of the polymeric resin comprises a polyamide blended or alloyed with a polyolefin.

Aspect 41. The method of any of aspects 38-40, wherein the polyamide of the polymeric resin comprises a copolyimide, optionally an elastomeric copolyamide.

Aspect 42. The method of aspect 41, wherein the copolyamide comprises a polyether block amide copolymer (PEBA).

Aspect 43. The method of aspect 42, wherein the PEBA includes an elastomeric PEBA.

Aspect 44. The method of aspect 42 or 43, wherein the PEBA includes a thermoplastic PEBA Aspect 45. The method of any of the above aspects, wherein the closed-cell foam includes a chemically blown foam.

Aspect 46. The method of any of the above aspects, wherein the closed-cell foam includes a physically blown foam.

Aspect 47. The method of any of the above aspects, wherein the closed-cell foam includes a physically blown foam, wherein the physical blown foam is a foamed product of foaming polymeric resin using a physical blowing agent chosen from an inert gas, an inert liquid, an inert supercritical fluid, or any combination thereof.

Aspect 48. The method of aspect 47, wherein the inert gas, the inert liquid, the inert supercritical fluid, or the combination thereof comprises carbon dioxide, or comprises elemental nitrogen, or comprises dinitrogen, or comprises any combination thereof.

Aspect 49. The method of any of the above aspects, wherein the closed-cell foam is a polyamide closed-cell foam formed by foaming a polymeric resin comprising a polyamide homopolymer or copolymer, and the closed-cell foam is a physically blown foam foamed using a physical blowing agent chosen from the inert gas, the inert liquid, the inert supercritical fluid, or any combination thereof.

Aspect 50. A method, comprising:
exposing a filled, sealed mold filled with a plurality of separate pieces of foamed material to a heating cycle;
at a threshold temperature, unsealing the filled, sealed mold until a pressure reduces to within a threshold of atmospheric pressure; and
following the unsealing, cooling the filled mold prior to removing a single-piece molded foam article from the mold.

Aspect 51. The method of aspect 50, wherein cooling the filled mold includes re-sealing the filled mold following the reduction of pressure, the method further comprising cooling the filled, sealed mold.

Aspect 52. The method of aspects 50 or 51, wherein the heating cycle is carried out at a higher than atmospheric pressure.

Aspect 53. The method of any of aspects 50-52, further comprising trimming the single-piece molded foam article to form a cushioning element.

Aspect 54. The method of any of aspects 50-53, wherein the plurality of separate pieces of foamed material includes chopped pieces of scrap foamed material remaining after forming one or more components of an article of footwear, wherein the foamed material is a crosslinked elastomeric foamed material.

Aspect 55. The method of any of aspects 50-54, further comprising, after the pressure reduces to atmospheric pressure, resealing the filled mold and cooling the filled mold, and, upon reaching another threshold temperature, unsealing the filled mold to remove the compressed foamed material, the another threshold temperature lower than the threshold temperature.

Aspect 56. The method of any of aspects 50-55, wherein the mold includes one or more cavities which are filled with an amount of chopped foamed material based on a compression ratio of the cushioning element.

Aspect 57. The method of any of aspects 50-56, wherein the chopped foamed material includes pieces with one or more sides having a largest dimension in a range of 1 mm to 50 mm, or in a range of 3 mm to 25 mm, or in a range of 8 mm to 15 mm, and wherein the compression ratio of the compressed foamed material is from 110-400%, or 125-300%, or 150%-250%.

Aspect 58. The method of any of aspects 50-57, wherein the foamed material is a closed-cell foam comprising a polyether block amide copolymer (PEBA).

Aspect 59. An article of manufacture, comprising:
a cushioning element including a single-piece molded foam article;
wherein the single-piece molded foam article is an article made according to any one of aspects 1 to 58.

Aspect 60. The article of aspect 59, wherein the article of manufacture is one of an article of apparel, an article of footwear, an article of sporting equipment, a component of an article of apparel, a component of an article of footwear, or a component of an article of sporting equipment.

Aspect 61. The article of aspect 61, wherein the article of manufacture is an article of footwear.

Aspect 62. The article of aspect 59, wherein the cushioning element is a sock liner.

Aspect 63. The article of any of aspects 59-62, wherein the single-piece molded foam article comprises a closed-cell foam.

Aspect 64. The article of aspect 63, wherein the closed-cell foam is a foamed product of a polymeric resin.

Aspect 65. The article of aspect 63 or 64, wherein the closed-cell foam is a foamed and crosslinked product of a thermoplastic polymer resin.

Aspect 66. The article of any of aspects 63-65, wherein the closed-cell foam is a foamed product of a thermoplastic polymeric resin comprising a thermoplastic polymer chosen from one or more of a thermoplastic polyurethane, a thermoplastic polyester, a thermoplastic polyether, a thermoplastic polyamide, a thermoplastic copolymer thereof, or a thermoplastic mixture thereof.

Aspect 67. The article of any of aspects 63-66, wherein the closed-cell foam comprises a cross-linked foam.

Aspect 68. The article of any of aspects 63-67, wherein the closed-cell foam is a foamed product of a polymeric resin comprising a polyamide.

Aspect 69. The article of any of aspects 63-68, wherein the closed-cell foam is a foamed and crosslinked product of a polymeric resin comprising a polyamide.

Aspect 70. The article of any of aspects 63-69, wherein the closed-cell foam comprises a cross-linked polyamide.

Aspect 71. The article of any of aspects 68-70, wherein the polyamide of the polymeric resin comprises polyamide-6, polyamide-11, polyamide 6,6, or any combination thereof.

Aspect 72. The article of any of aspects 68-71, wherein the polyamide of the polymeric resin comprises a polyamide blended or alloyed with a polyolefin.

Aspect 73. The article of any of aspects 68-72, wherein the polyamide of the polymeric resin comprises a copolyamide.

Aspect 74. The article of any of aspects 68-73, wherein the copolyamide comprises a polyether block amide copolymer (PEBA).

Aspect 75. The article of any of aspects 68-74, wherein PEBA includes an elastomeric PEBA.

Aspect 76. The article of any of aspects 68-75, wherein PEBA includes a thermoplastic PEBA.

Aspect 77. A method of manufacturing an article of footwear, the method comprising:
affixing an upper to a sole structure, wherein the sole structure comprises a single-piece molded foam article manufactured according to the method of any one of claims 1 to 58.

Aspect 78. An article of manufacture, comprising:
a cushioning element including a molded foam article having a plurality of foam pieces fused together without any adhesive.

Aspect 79. The article of claim 77, wherein the molded foam article is an article made according to the method any one of claims 1 to 58 or including one or more of the features of any one of claims 59-76.

An example of an article of footwear is shown in FIG. 1. The article of footwear may include an upper connected to a sole structure. The sole structure comprises one or more of a midsole and an outsole. The components of the sole structure, a sock liner, and the upper of the article of footwear is depicted in an exploded view in FIG. 2 to show an ordering and geometry of the article of footwear components. The sole structure may include an outsole with a core carrier and a cushioning element in a core of the outsole, as shown in FIG. 3.

Footwear, and in particular, athletic footwear, may include an upper and a sole structure. While the upper covers a foot and securely positions the foot with respect to the sole structure, the sole structure is positioned under the foot and provides a barrier between the foot and the ground. A sock liner may be positioned on the sole structure as an interface between the foot of a wearer and the sole of the article of footwear such that the wearer may comfortably participate in activities, such as walking and running.

As described herein, one or more components of the footwear, and/or sections thereof, may comprise a foam article formed from the processes described herein. The foam article may be a cushioning element in an example.

The sole structure may be formed from one or more stacked layers, including a midsole and an outsole. An insole may be a topmost layer positioned in the upper and configured to be adjacent to a sock liner which engages comfortably with the foot of the wearer. The sock liner may be cushioned and made of foamed materials to provide support and comfort to the wearer's foot. In an example, the sock liner may be molded using the processes described herein from scrap or other foamed material pieces. The midsole may be secured to the upper along a length of the upper and form a middle layer of the sole structure between the insole and the outsole. The midsole may be formed from a sheet of foam. Shock absorption, stability, and motion control are imparted to the wearer's foot by the midsole. The outsole is a bottommost layer of the sole structure and contacts the ground, due to its positioning under the midsole. The outsole may be formed from a durable, rugged material adapted with texturing to provide traction to the footwear. The outsole may include cut-outs releasing a cushioning component underneath, where the cushioning component may be formed from the molding processes described herein. In one example, the core carrier holds an internal structure, which as described herein may include re-combined scrap foamed material, to provide support and cushioning for the footwear. The example layers are for illustrative purposes and one or more of them may include multiple components and/or layers or be divided into continuous and/or discontinuous sections. Further, various layers may be omitted.

Figure 5:
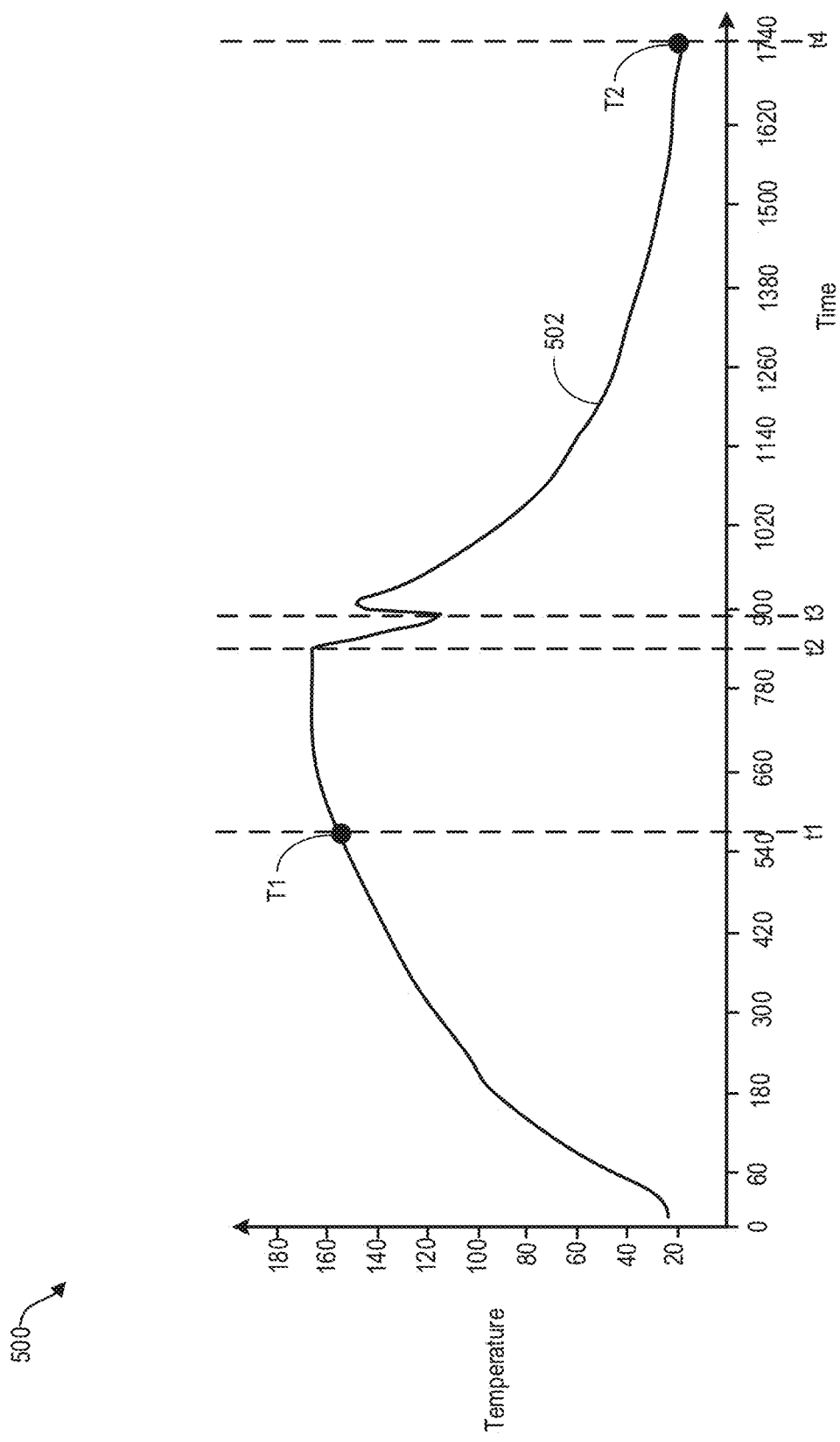
FIG. 5 shows an example plot of variation in temperature during processing of the scrap foamed material.
Figure 6:
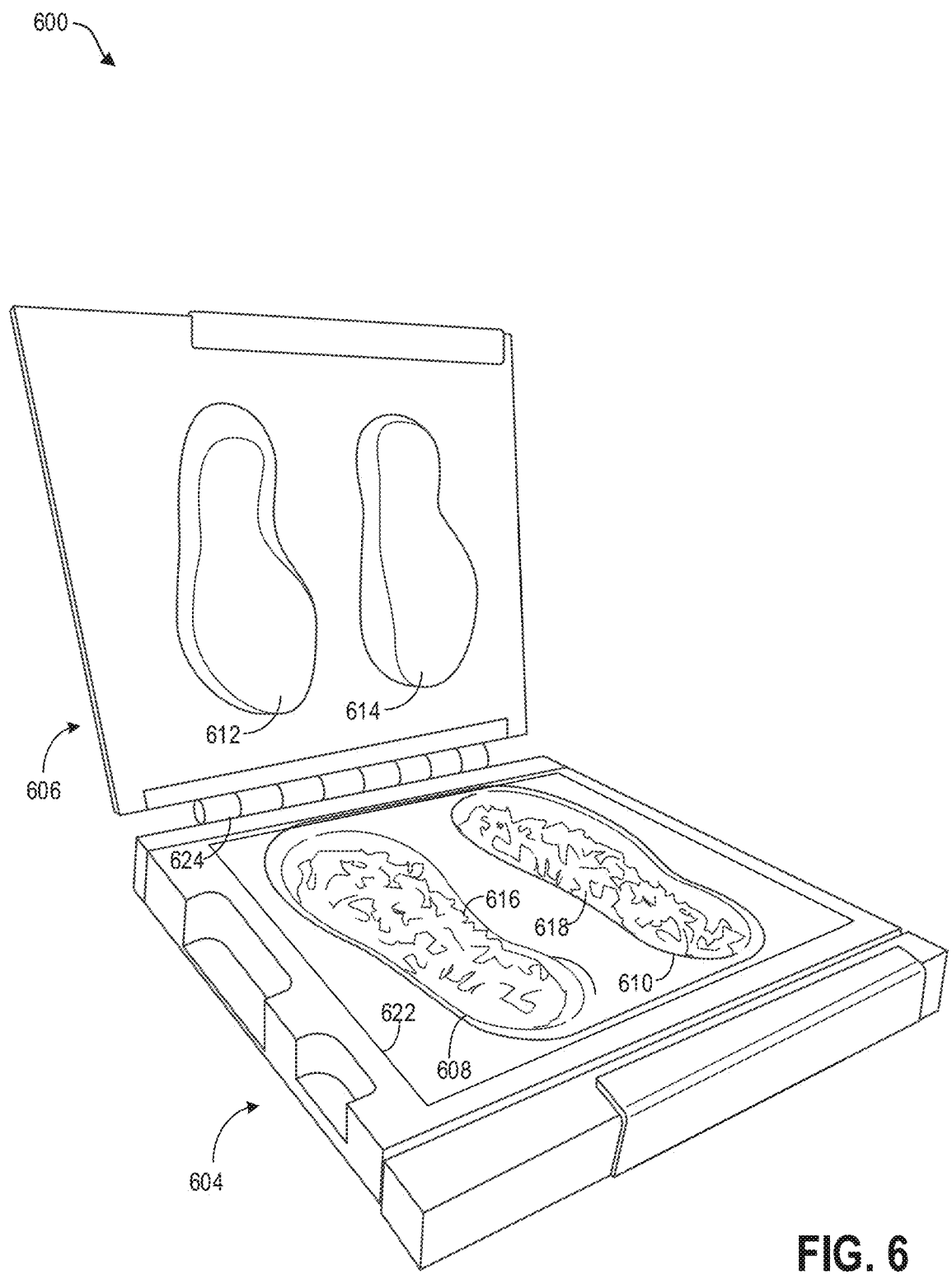
FIG. 6 shows a schematic of an example mold used in processing of the scrap foamed material.
Figure 8:
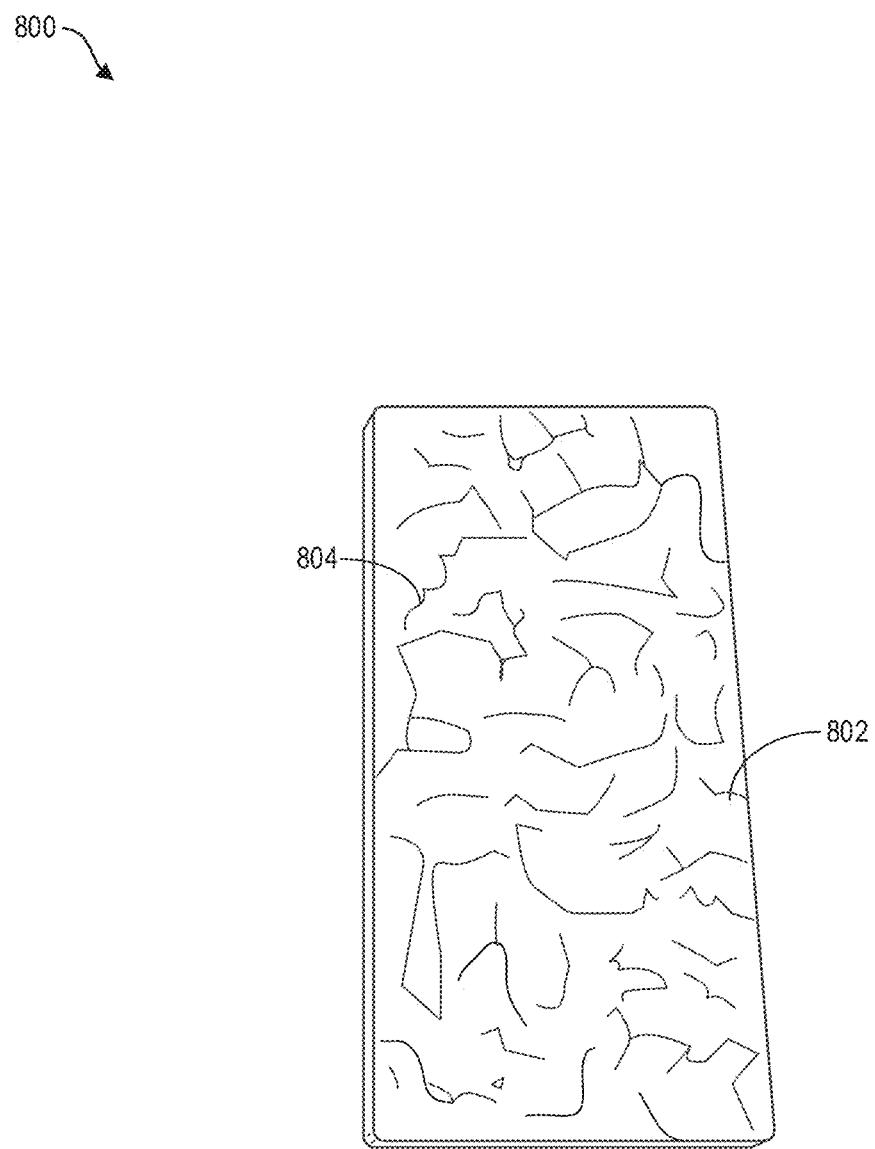
FIG. 8 shows a texture of a sheet of molded, foamed material formed from the scrap foamed material.
Figure 9:
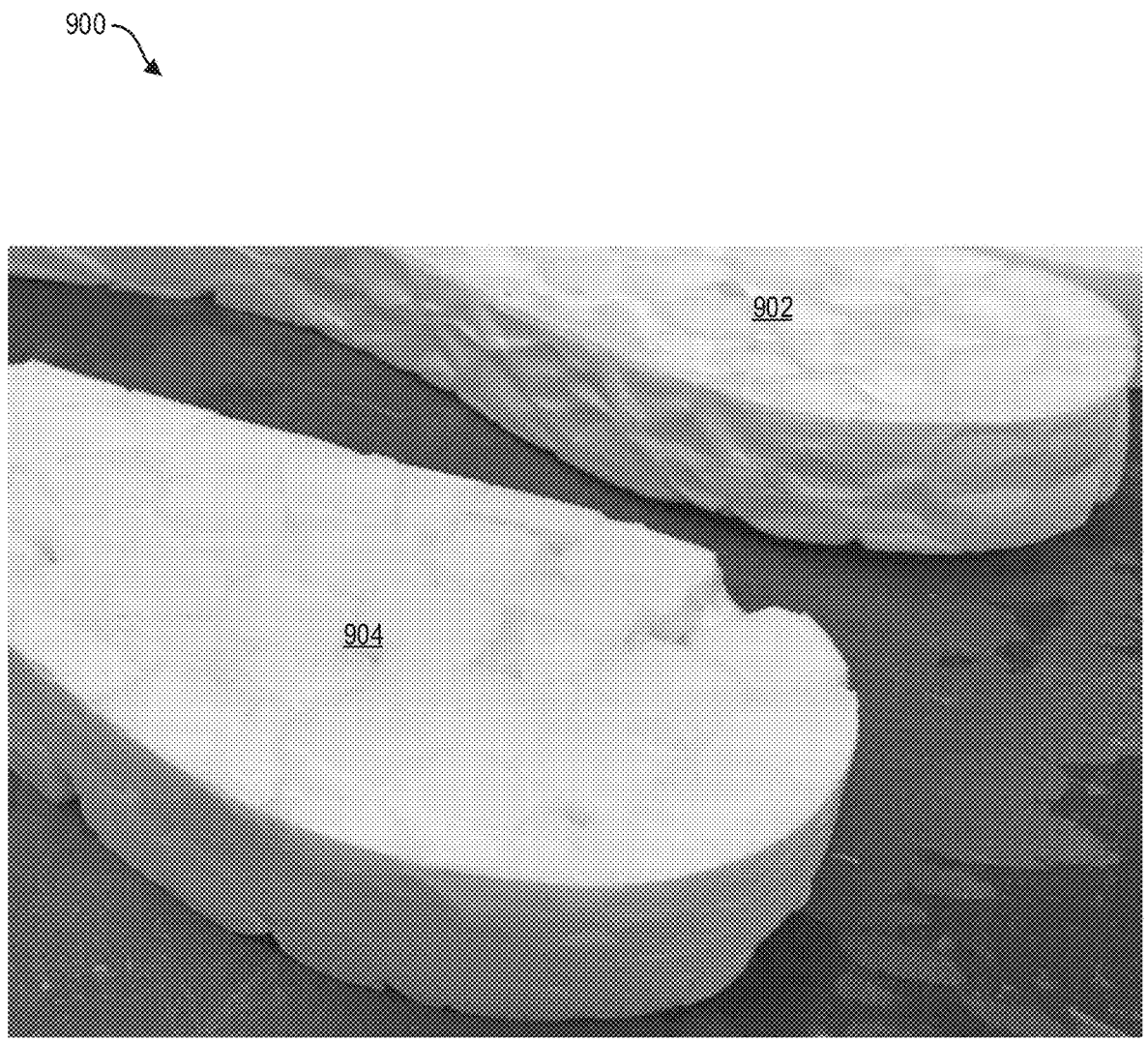
FIG. 9 shows example molded foam articles processed with different pressure release rates.

As noted above, foam pieces (which may or may not be scrap from forming one or more of the various components of the footwear, such as a portion of the sheet remaining after the midsoles have been formed) may be repurposed from other manufacturing processes to form cushioning elements and/or other elements of the footwear, such as the sock liner and/or the cushioning element within the core carrier. In one example, the method described with regard to FIG. 4 may be used. The processing steps carried out may enable repurposing of scrap foamed material as schematically shown in FIGS. 7A-F. During repurposing of the scrap foamed material, the scrap foamed material is reformed in a mold and the temperature is varied over a heating and cooling cycle, as shown in the plot of FIG. 5. An example mold used in processing of the scrap foamed material is schematically shown in FIG. 6. FIG. 8 shows a texture of a sheet of molded foamed material formed from the scrap foamed material, and FIG. 9 shows example molded foam articles processed with different pressure release rates.

In one example, the midsole may be formed from a sheet of a closed-cell foam. In another embodiment, footwear components, such as the midsole, may be fabricated by directly foaming resin pre-forms and subsequently molding the foamed resin pre-forms in the shape of the footwear component.

As noted herein, closed-cell foam pieces may be remolded according to the processes described herein to form a cushioning element. As described herein, the closed-cell foam is understood to be a foamed product of a polymeric resin. The polymeric resin can comprise a polyamide, a polyurethane, a polyester, a polyether, any copolymer thereof, or any mixture thereof. The polymeric component of the polymeric resin, comprising all the polymeric materials present in the resin, can consist essentially of a polyamide, a polyurethane, a polyester, a polyether, any copolymer thereof, or any mixture thereof. For example, at least 95 weight % of the polymeric resin can be made up of a polyamide, a polyurethane, a polyester, a polyether, any copolymer thereof, or any mixture thereof.

The closed-cell foam may be a foamed and crosslinked product of a thermoplastic resin. The thermoplastic resin may comprise a thermoplastic polyamide, a thermoplastic polyurethane, a thermoplastic polyester, a thermoplastic polyether, a thermoplastic copolymer thereof, or a thermoplastic mixture thereof. In one example, the closed-cell foam is an elastomeric closed-cell foam.

The polymeric resin may be a polyamide resin comprising a polyamide homopolymer or a polyamide copolymer. The polyamide of the polymeric resin may comprise polyamide-6, polyamide-11, polyamide 6,6, or any combination thereof. The polyamide of the polymeric resin may comprise a polyamide-polyolefin copolymer, or a polyamide blended or alloyed with a polyolefin. The polyamide of the polymeric resin may comprise a copolyamide. The copolyamide may comprise a polyether block amide copolymer (PEBA). The PEBA may include an elastomeric PEBA and/or a thermoplastic PEBA. PEBA is a copolymer having both polyamide and polyether backbone block segments.

In another example, the polymeric resin may comprise ethylene vinyl acetate (EVA), rubber, or silicone. Further, the closed-cell foam described herein may be formed by compression molding, injection molding, open pouring, or casting, among others, or combinations thereof.

In one example, the polymeric resin may be formed into a sheet or an article and the sheet or article may then be processed to foam the polymeric resin, forming a foam having a closed-cell foam structure. An example method for forming a closed-cell foam structure may comprise: subjecting a polymeric resin to at least one inert liquid, gas, or supercritical fluid at a first pressure higher than atmospheric pressure in order to drive the inert liquid, gas, or supercritical fluid into the polymeric resin, raising the temperature of the polymeric resin to or above its softening point, and then lowering the pressure to a second pressure higher than atmospheric pressure but lower than the first pressure, where the inert liquid, gas, or supercritical fluid forms gas bubbles in the softened polymeric resin and expands the volume of the softened polymeric resin, forming a closed-cell foam structure. The inert liquid, gas or supercritical fluid can comprise elemental nitrogen, dinitrogen, carbon dioxide, or any combination thereof. The polymeric resin may then be cooled to below its softening point to solidify the polymeric resin, retaining its closed-cell foam structure.

Depending upon the properties of the polymeric resin, the polymeric resin may be at least partially crosslinked prior to expansion, during expansion, or following expansion. In some cases, the level of crosslinking may be sufficient to increase a strength of the polymeric resin or allow the polymeric resin to hold a foam structure while still allowing the crosslinked foamed material to retain sufficient thermoplastic properties to allow the resulting foamed material to soften sufficiently when molded to bond to itself. Crosslinks may be generated by use of crosslinking agents, such as triallyl isocyanurate (TALC) or triallyl cyanurate (TAC), or by irradiation by actinic radiation, such as ultraviolet light, thermal radiation, electron beam radiation, or gamma radiation.

The expansion of the polymeric resin can be conducted in a single step, or can be conducted in more than one step. For example, a partially expanded polymeric resin may be re-heated to a temperature at or above its softening point under a pressure of gas, and then the pressure may be reduced while maintaining the temperature at or above the softening point of the polymeric resin, in order to further expand the polymeric resin to result in the closed-cell foam. The foams obtained may be fabricated into a variety of desired shapes, such as sheets, tapes, blocks and rods, using techniques, such as cutting, welding, thermoforming, and adhesive bonding. Alternatively, the polymeric resin may be expanded directly into the desired shape, for example, by expanding impregnated polymeric resin in a mold.

At sea level, atmospheric pressure is approximately 760 mm of Hg. However, as weather conditions and altitudes change, atmospheric pressure may vary.

When components are cut from foam, such as a foam sheet, a significant portion of the foam may remain as scrap material. In order to reduce environmental waste, it is desirable to repurpose this scrap material to form other useful parts. However, often it is difficult to recombine the scrap material and achieve desirable properties, such as uniformity, clean edges, consistency throughout the material, etc. The inventors herein have recognized these and numerous other issues with existing methods of processing scrap material.

Specifically, due to characteristics of the scrap material (such as a thermoplastic elastomer), it may not be possible to effectively grind the scrap material and directly re-remold it to form a part. Also, certain processing (such as high temperature) may cause degradation of the scrap material characteristics (such as shrinkage, compressive strength, hardening, burning, etc.) of the original foamed material. Further, addition of binders or similar additives during processing of the scrap foamed material may not be desired in order to reduce volatile organic compounds and/or allow further re-processing of the scrap material.

One or more of the issues described above may be at least partially addressed by one or more of the methods disclosed herein, including a method for forming an article of apparel, comprising, forming pieces of foam, such as closed-cell foam, such as by sub-dividing scrap foamed material remaining from forming a first apparel component; molding the sub-divided scrap foamed material by exposure to a temperature cycle within a mold having a seal; and, during the temperature cycle, opening the mold at least once to release gases and/or pressure. The temperature cycle may include heating the mold and/or the pieces of scrap foamed material in the mold until an average temperature of the pieces of scrap foamed material reaches a minimum temperature at which the pieces of scrap foamed material soften sufficiently to enable physical bonding with neighboring, touching pieces of scrap foamed material. The bond may include a bond that is formed without any adhesive, such as without any volatile organic compound adhesive, and without any other components between the neighboring pieces of scrap foamed material that are touching upon heating, or were touching upon positioning in the mold. Upon release of pressure and/or cooling, the molded article can be removed from the mold.

In one example, a method for repurposing the scrap foamed material remaining after forming midsoles may include sizing the scrap foamed material by, for example, appropriately chopping and filtering. The chopped pieces of scrap foamed material may then be dried to remove any moisture and then the dried prices of scrap foamed material may be loaded on to a cavity of a mold. The mold may be designed (such as the depth of the cavity) based on the compression ratio of the scrap foamed material to be formed, which in turn may be based on the part to be manufactured. The mold may then be closed, sealed, and exposed to a temperature cycle under increased pressure. Upon the scrap foamed material reaching a threshold temperature, the mold may be opened to release any residual gases. The mold may then be resealed and cooled. Once cooled, the compressed foamed material may be removed from the mold and trimmed according to dimensions of specific elements, such as sock liners and core carriers. A series of characterization tests may be carried out on the formed material to establish the physical properties of the compressed foamed material and compare the physical properties to standards for materials typically used for the specific elements.

In this way, the scrap foamed material remaining after manufacture of certain article of footwear elements may be recycled and more effectively used for manufacturing other elements of another article of footwear (or even the same article of footwear), thereby reducing waste from the article of footwear manufacturing process. By using the above-mentioned processing method for forming compressed foamed material, a material of desired compression ratio and thickness may be formed without the use of additives or binders. The technical effect of molding the sub-divided scrap foamed material under a temperature cycle and releasing residual gases above a threshold temperature is that the physical properties of the final, compressed foamed material may not be significantly degraded and may be effectively utilized to form article of footwear elements, such as sock liners and core carriers. The compressed foamed material may additionally be used in other applications, such as in helmets, apparel, sports equipment, and other such objects where a foam padding may be desired.

It has been found that releasing residual gasses or pressure present in the mold once an average temperature of the foam reaches a threshold temperature is particularly beneficial when molding foams expanded using an inert liquid, gas, or supercritical fluid as a physical blowing agent, including elastomeric foams. Without being bound by theory, it is believed that residual physical blowing agent present in the foam may migrate out of the foam when the temperature of the foam is increased during the molding process, and may impact the ability of the foam pieces to bond to each other and to conform to the shape of the mold. Release of the pressure present in the mold allows any residual physical blowing agent to form a gas and be released from the mold, particularly when the pressure within the mold is rapidly released to a pressure near atmospheric pressure.

Turning now to FIG. 1, an article of footwear 100 may comprise an upper 102 and a sole structure 104. A set of reference axes 101 is provided, indicating a y-axis, an x-axis, and a z-axis. The upper 102 may be arranged above the sole structure 104 and adapted to allow a foot to be inserted into a cavity of the article of footwear 100 through an opening 106. The foot is held in place in the article of footwear 100 by the upper 102 and may directly contact inner surfaces of the upper 102. To provide comfortable engagement of the foot with the upper 102, the upper 102 may be constructed from a flexible synthetic material, such as polyester, nylon, synthetic leathers, or a natural material, such as leather. The article of footwear 100 may further include a sock liner arranged along an inner surface of the upper 102, inside the cavity of the article of footwear, which may also be attached to the upper 102 by stitching.

The upper 102 may be adapted with a lacing system 108, including a set of laces threaded through apertures in the upper 102 along a region of the upper 102 adjacent to an instep of the foot when the article of footwear 100 is worn. In other examples, the upper 102 may have a hook-and-loop fastening attachment instead of the lacing system 108 or neither the lacing system 108 or the hook-and-loop fastening attachment. The lacing system 108 may be used to tighten the upper 102 around the foot and enhance a securing of the foot inside the article of footwear 100.

The upper 102 may be secured along a bottom edge 110 to the sole structure 104. The sole structure 104 may include an insole positioned inside the cavity of the article of footwear 100 along a footbed of the article of footwear, a midsole 112, and an outsole 114. The midsole 112 is directly adjacent to and above the outsole 114 so that the midsole 112 and the outsole 114 are in face-sharing contact, the shared face coplanar with an x-z plane. The sock liner may be positioned above (and in face sharing contact with) the insole along the footbed of the article of footwear 100. In some examples, a thickness, defined along the y-axis, of the midsole 112 may vary according to a desire for increased shock absorption at certain regions relative to the foot. For example, a region under a heel of the foot may be thicker than a region under a ball of the foot if the article of footwear 100 is adapted for long distance running. In addition, a firmness of the midsole 112 may be non-uniform along the midsole 112 to provide stability or cushioning in desired regions of the midsole 112.

The outsole 114 may have an upper face 116 that is contoured to match a bottom face 118 of the midsole 112. A bottom face 120 of the outsole 114 may be textured to provide traction to the article of footwear 100. The outsole 114 may be formed from a material that is less compressible and more durable than the midsole 112, such as carbon rubber or blown rubber.

Figure 2:
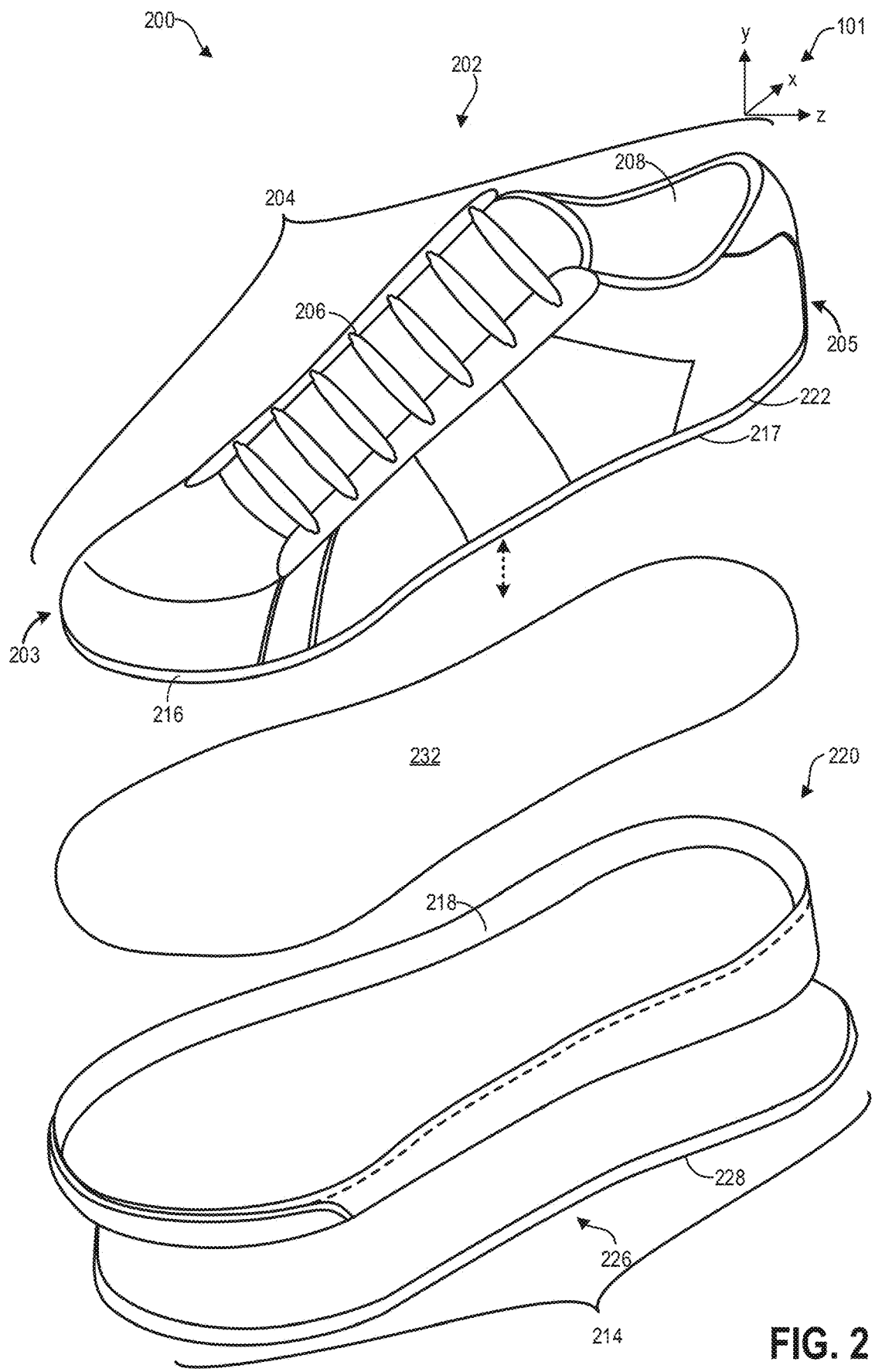
FIG. 2 shows an exploded view of an example of an article of footwear, including an upper, a midsole, and a sock liner.
Figure 3:
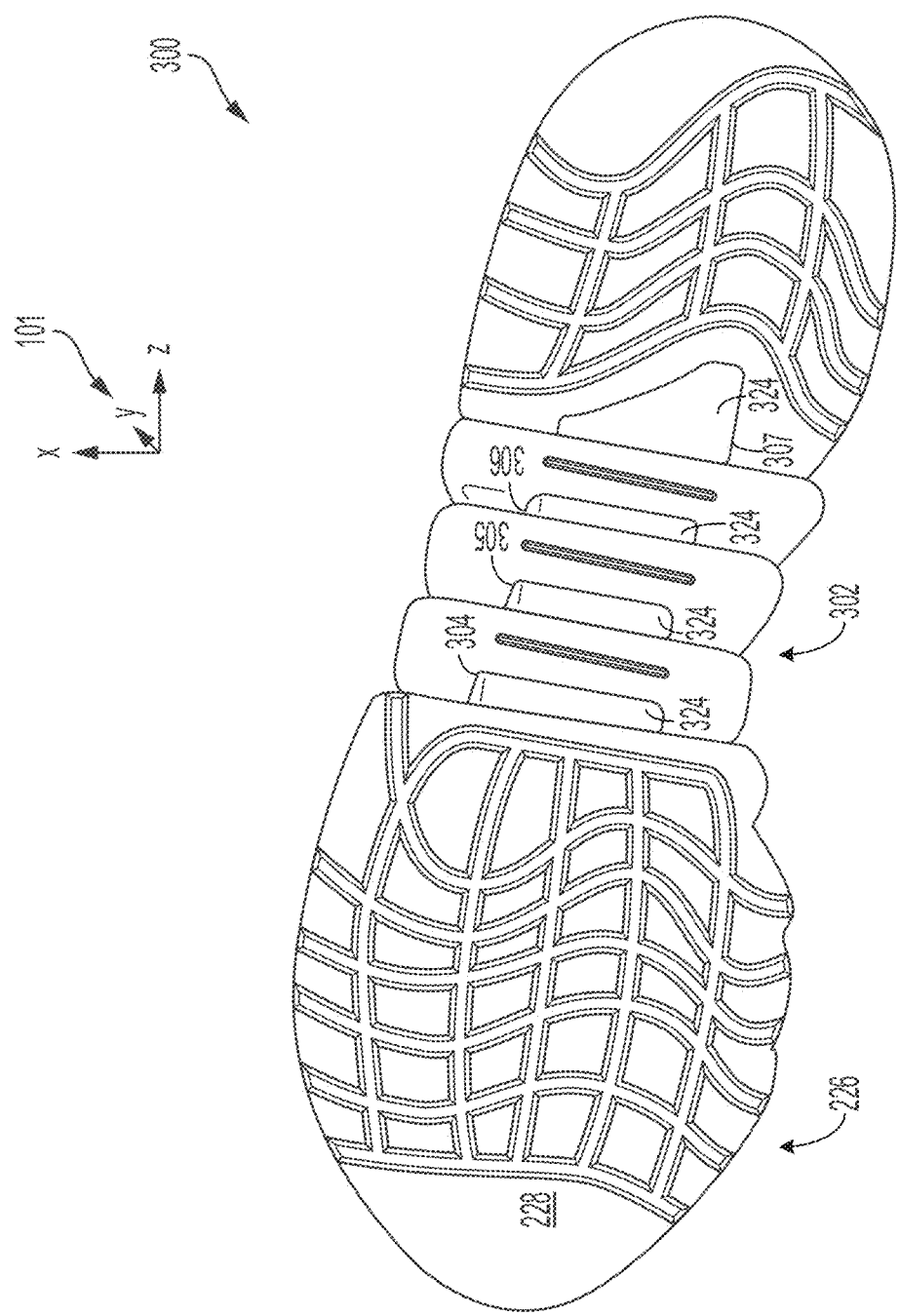
FIG. 3 shows a bottom face of an outsole of the article of footwear of FIG. 2, including a core carrier with a plurality of cores formed of a foamed material.

The components of an article of footwear 202 are shown in an exploded view 200 in FIG. 2. The article of footwear 202 has a toe region 203 and a heel region 205 and comprises an upper 204 with a lacing system 206 and an opening 208 as well as a sole structure 214 that includes a midsole 216 and an outsole 226. A cushioning member 220 may be positioned between the midsole 216 and the outsole 226. The upper 204 may have an attached sock liner that lines an interior of the upper 204 or may be directly stitched to a seamed footbed that provides a bottom surface to the upper 204. Furthermore, a sock liner 232 may be positioned below the upper 204 and above the midsole 216 that is contoured to match a shape of a foot. In one example, the sock liner 232 may be formed from the same material as the midsole 216, such as a foamed material. Further, an insole may be arranged below the sock liner 232 or the seamed footbed at a bottom of an inner cavity of the article of footwear 202 and may be formed from EVA. The sock liner 232 may be removable or fixed (cemented) to the insole of the article of footwear 202. In certain articles of footwear, the insole and the sock liner 232 may be the same element.

The sole structure 214 may be shaped to match an outer geometry of a bottom edge 222 of the upper 204. The midsole 216 may have a raised edge 218 surrounding at least a portion of a perimeter of the midsole 216 that extends above an upper surface of the midsole 216. A width of the midsole 216, defined along the x-axis, may be wider than a width of the upper 204 and the insole so that the bottom edge 222 of the upper 204 may fit within and be surrounded by the raised edge 218 of the midsole 216. A width of the cushioning member 220, defined along the x-axis, may be wider than a width of the upper 204 so that the bottom edge 217 of the midsole 216 may fit within and be surrounded by the raised edge 218 of the midsole 216.

Portions of the outsole 226 in FIG. 2 may be similarly shaped as the midsole 216 and the cushioning member 220, but the outsole 226 may alternatively comprise a plurality of sections that are fixed to regions of a bottom surface of the midsole 216. The outsole 226 may be adapted to provide traction in desirable regions of the sole structure 214, such as under a ball of the foot. The outsole 226 may be thinner, as defined along the y-axis, than the midsole 216. The outsole 226 may be contoured to match a shape of the midsole 216 and include a textured bottom face 228.

The outsole 226 may, in some examples, be formed as a core carrier, and may include an opening filled with one or more foam cores, which may be a cushioning element as described herein. Foam cores, while having a different shape than the sock liner 232, may be formed from the same foamed material used to form the sock liner 232, the midsole 216, and the cushioning element of an article of footwear.

FIG. 3 shows a bottom view of an example outsole of an example article of footwear. Example sole 300 includes a bottom face 228 of an outsole 226. Cushioning elements 324 in the outsole 226 may be termed as "cores" and the cushioning elements 324 may be carried in a "carrier" formed in a sole, such as in the outsole 226 or between the outsole 226 and a midsole, or in other regions of the sole. In one example, the core 324 may include or be a cushioning element (such as cushioning member 220 in FIG. 2) positioned between the midsole and the outsole 226. In another example, a different core 324 may be positioned on an upper surface (opposite to the bottom face 228) of the outsole 226. In one example, the core may extend throughout a length and width of the outsole 226 and/or a portion thereof.

The sculpted and detailed bottom face 228 may be made from an elastomeric polymer. A portion 302 of the bottom face 228 may include a plurality of cut-away areas 304, 305, and 306 to expose regions of a single core 324. In this example, four cut-away areas 304, 305, 306, and 307 have been shown, however, any number of cut-away areas may be present, and the cut-away areas may be of various shapes and sizes. Three of the cut-away areas 304, 305, and 306 are rectangular slots parallel to each other while the fourth cut-away area 307 is triangular. The cut-away areas may extend through the outsole 226, e.g., along the y-axis. All cut-away areas may be of equal depth extending through the outsole 226 or each slot may have a different depth. By including cut-away areas in the bottom face, the relatively heavier material of the outsole 226 may be reduced and the article of footwear may be made lighter. Also, visibility of the cushioning element 324 makes the article of footwear aesthetically appealing.

The midsole and other components of the footwear may be manufactured from a sheet of foamed material by manufacturing methods, such as compression molding, injection molding, open pouring, and casting, among others. Once the midsoles are formed out of the foam sheet, a portion of the sheet may remain as scrap material, the scrap material having the same properties as that of the formed midsoles.

FIG. 7A shows a schematic 700 of a sheet 704 of foamed material from where an apparel component, such as a midsole 708 has been removed. When the midsole 708 has been formed (such as by cutting) and separated, a cavity 706 of mold 702 remains in the sheet 704. Due to the shape of remaining the sheet 704 with the cavity 706, no other midsoles may be cut out of the sheet 704 rendering the sheet as scrap foamed material. However, discarding a substantial amount of scrap foamed material may be detrimental to the environment and it is desired to repurpose this scrap foamed material.

Figure 4:
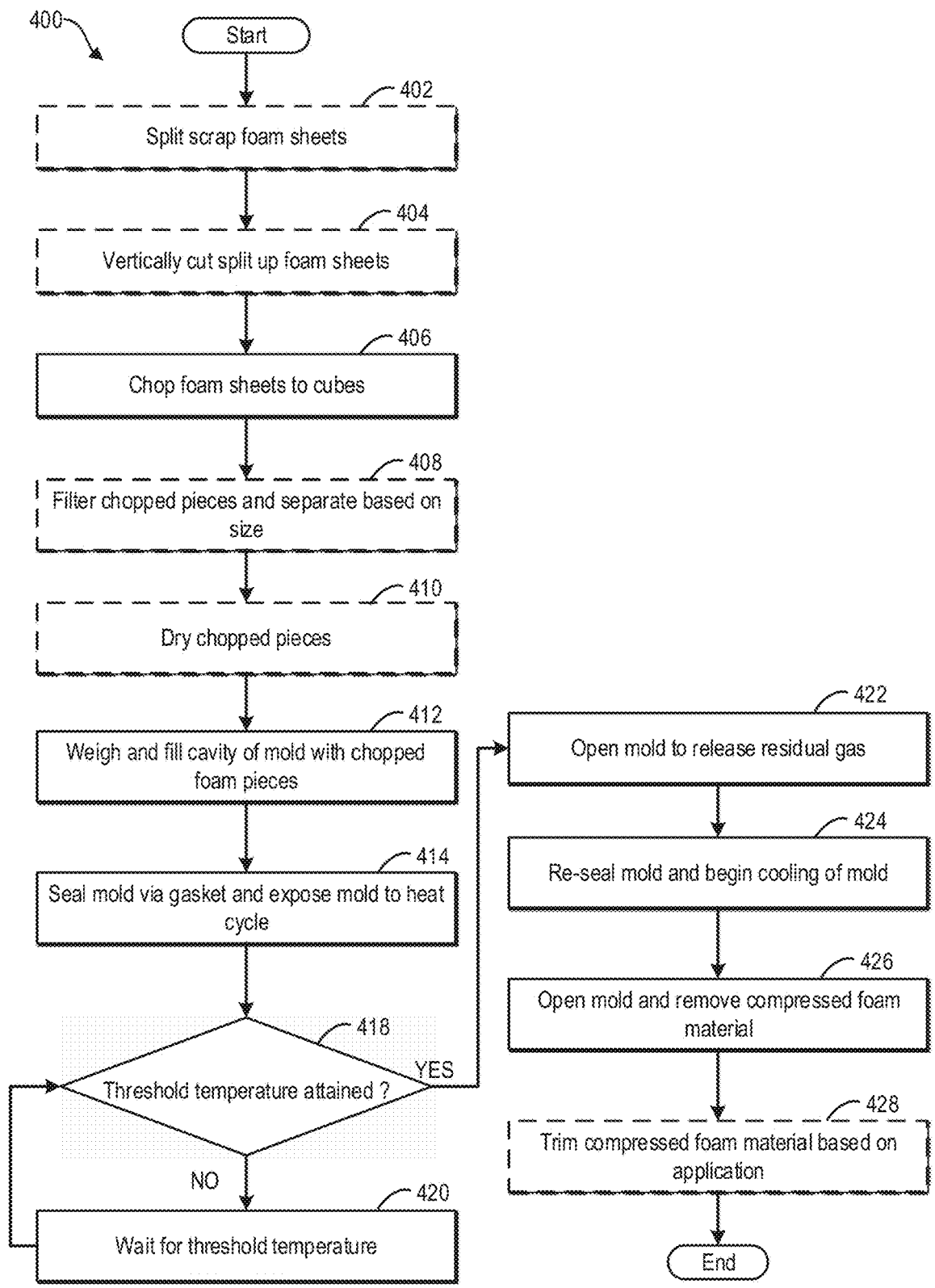
FIG. 4 shows an example method of processing scrap foamed material remaining after forming apparel components.

FIG. 4 elaborates an example method 400 for repurposing scrap foamed material remaining after forming apparel components, such as article of footwear midsoles. Scrap foamed material remaining after forming midsoles of the article of footwear may be used to form other cushioning components (such as sock liners and cores) of the same article of footwear or of one or more other articles of footwear. The scrap foamed material may be a closed-cell foam, which may be a foamed and cross-linked product of a thermoplastic resin comprising polyamide, polyurethane, polyester, polyether, a thermoplastic copolymer, or a thermoplastic mixture. The polyamide of the polymeric resin may comprise a polyamide blended or alloyed with a polyolefin or a copolyamide. The copolyamide may comprise a PEBA, which may include an elastomeric PEBA and/or a thermoplastic PEBA. Closed-cell polyamide foams may be prepared by subjecting a polyamide resin to inert gases at an elevated pressure and at a temperature above the softening point of the polyamide resin and reducing the pressure while the temperature is maintained above the softening point of the polyamide resin, resulting in expansion of the polyamide resin. Method 400 elaborates effective processing of the scrap foamed material, while maintaining low energy loss and high resilience of the original foam.

FIG. 4 is shown with various actions, various of which may be optional. FIG. 4 illustrates generally a method 400 including sub-dividing a closed-cell foam forming a plurality of pieces, which may include one or more of actions 402-408, or other sub-dividing actions. Further, the method 400 may include molding the plurality of pieces by exposure to a temperature cycle within a mold, and forming a molded foam article, where, during the temperature cycle, the mold is opened at least once to release gases and/or pressure. The molding may include actions 414-426, for example, or alternatively other molding actions.

Turning now to the example actions of FIG. 4, at 402, optionally, the scrap foam sheets may be split into sheets of a desirable uniform thickness. The scrap foam sheets may have two broader (front and back) surfaces and two narrower side surfaces. As an example, the original foam sheets may come in thicknesses of 10 mm-40 mm (dimension of the narrower side surfaces). In one example, a surface skin may be present on each broader surface and a side skin may be present on each narrower surface.

In the splitting process, a foam sheet may be split along its thickness into two or more sheets, each with a desirable thickness. In one example, the desirable thickness may be in the range of 10 mm to 40 mm. In another example, the desirable thickness is 10 mm with an error margin of 2 mm. Other sizes may also be used, and the foam sheets may be of various shapes. A foam sheet that has a thickness of 10 mm may have lower number of voids and holes on the broader surfaces. The split foam sheets may include smaller volumes of foamed material relative to foam sheets that have not been split. An even surface of the foam sheet with a dense edge is desired for cosmetic appeal of such foams. Also, further processing of the foam sheets, such as chopping, is facilitated when the foam sheets are first split to the desirable thickness. During the splitting process, the surface skin on the broader surfaces may be removed while the skin on the narrower sides may be retained. After splitting, each foam sheet may have a desired thickness without any change to its length. As an example, step 402 is optional and the processing of the scrap foamed material may be continued without carrying out this step.

Once the foam sheets have been split, at 404, optionally, each split up scrap foamed sheet may be vertically cut along the broader surface to form sheets of shorter length compared to the original foam sheet. By vertically cutting the split up foam sheets, it would be easier to subsequently process the foam sheets. Also, cutting the foam sheets into pre-determined sizes reduces variation in the chopped cubes formed subsequently from these foam sheets and also the cubes formed would have fewer voids and holes. The vertical cutting may be carried out as a single process in a single machine with multiple blades or the vertical cutting may be carried out as a series of steps with different machines, the machines having variation in the configuration of blades.

FIG. 7B shows a schematic representation 710 of a scrap foam sheet 714 remaining after forming an apparel component (such as a midsole) which is being repurposed. The scrap foam sheet 714 may be first split (cut) along the x-z plane to reduce the thickness "T" of the scrap foam sheets to a desirable thickness. The scrap foam sheet 714 may then be further cut along the x-y plane to reduce the length "L" of the scrap foam sheets. After the cutting the scrap foam sheet 714, the thickness of the scrap foam sheet may be in the range of 8 mm to 15 mm and the length of the scrap foam sheet may be in the range of 4 cm to 10 cm.

Returning to FIG. 4, at 406, the foam sheets may be chopped to form rectangular-prism-shaped pieces, such as cubes or other volumes. The chopping may be used to form pieces substantially having the same size in each dimension within a relative range of 25-400%, as an example of a relative side length range. Further, the pieces may be formed to have six sides, or more or less than six sides. The faces of the sides may be of various shapes, and the edges may be rounded in examples.

The foam sheets may be loaded on to a chopping machine where blades are configured to chop the sheets into small cubes. The foam sheets may be chopped at two or more machines, each with blades operating at different frequencies. In one example, each volume may have a side of 8 mm-15 mm (target size in each dimension). In another example, each volume may have a side of 10 mm. By cutting the foam sheets to desired sized volumes, the subsequent molding process may be improved and the resultant part may exhibit uniformity along with desired stiffness and lower shrinkage. FIG. 7C shows a schematic 730 of chopped foam pieces 735 processed from the scrap foam sheet 714. Each chopped foam piece 735 may be a volume with an average side length in the range of 8 mm to 15 mm.

At 408, the chopped pieces may be optionally filtered and separated based on size. The chopped pieces may be passed through a series of filtering meshes of different sizes to filter and separate the chopped pieces. The chopped pieces may be first passed through a first filter with a first mesh size. As an example, the first mesh size may be 15 mm×15 mm. The chopped pieces that are larger than an upper threshold in size (side of a cuboid) may be collected in a box and transferred back to the first filter with the first mesh size to further decrease the size of the pieces to under the upper threshold size. In one example, the upper threshold size may be 15 mm. The chopped pieces that are smaller than the upper threshold size may be collected in a separate compartment and then these pieces are passed through a second filter with a second mesh size. As an example, the second mesh size may be 8 mm×8 mm. The cubes collected after filtration through the second filter may then be passed through a third filter with a third mesh size to eliminate dust and particles smaller than a lower threshold size. As an example, the lower threshold size may be 3 mm. All cubes of sizes between the upper threshold size and the lower threshold size may be gathered for further processing. In one example, the filtering and separation of the chopped pieces may not be carried out and the entire amount of chopped foamed material is used for the molding process.

The volumes may be auto-packed into packing pockets. The packing pockets may be loaded on a frame and then filled with a threshold weight of the chopped pieces. As an example, each packing pocket may be filled with 2 kilograms of chopped pieces.

At 410, the chopped pieces may be optionally dried to remove any desired moisture left in the foamed material. The foamed material may be hydrophilic in nature and, due to the large surface area of the chopped pieces, there may be significant moisture intake during storage of the chopped pieces. The moisture in the foamed material may not be desirable as it may cause a bumpy surface of the finished product and may also increase shrinkage. The chopped pieces may be loaded into a drying machine, which may be preheated to a threshold temperature and/or a humidity reduced below a threshold humidity. In one example, the threshold temperature may be in the range of 60° C. to 80° C. In another example, the threshold temperature may be in the range of 80° C. to 150° C.

The chopped pieces may be dried inside the drying machine, at the elevated temperature, for multiple days. As an example, the drying may be continued for six to ten days. Upon completion of the drying, a moisture content of the foamed material may be measured and verified to be lower than a threshold moisture content. As an example, the moisture content may be estimated based on a change in weight of the foamed material over the drying period. In one example, the threshold moisture content may be in the range of 2% to 5%. In another example, the threshold moisture content may be in the range of 1% to 8% or 0% to 4%.

At 412, the chopped pieces may be weighed and filled in a cavity of a mold to be compressed into sheets. In one example, the chopped pieces may be loaded in a mold cavity. The mold may then be loaded into a compression molding machine capable of heating the mold while applying pressure to it. Based on the article of footwear element to be manufactured from the compressed foamed material, the compression ratio (C/R) of the compressed foamed material may vary from 100% to 300%, or from 150% to 250%. The C/R may be based on the design and profile of the article of footwear element manufactured, with some elements being thinner than others. As an example, for a sock liner, the desired C/R may be from 200% to 240% whereas, for a core midsole, the C/R may be from 160% to 200%. The C/R may be defined as a volume filled by the foamed material before pressure or temperature is applied, relative to the volume filled during application of the pressure or temperature, expressed as a percentage.

The weight of chopped foam pieces to be loaded onto the cavity of the mold may be estimated as a function of volume of the article of footwear element manufactured, specific gravity of foam, and desired C/R. Due to lower specific gravity of the scrap foamed material, the volume and surface area of the chopped pieces may be high, which may cause flash after demolding. The loss in material (such as 5%-10%) due to flash may be taken into consideration during estimation of the weight of the chopped pieces foam to be loaded into the mold.

FIG. 6 shows a schematic of an example mold 600 used in compressing and molding the scrap foamed material. The mold may include a lower plate 604 and a top plate (also referred herein as lid) 606 coupled via a hinge 624. In an open position of the mold, the top plate 606 may not be in contact with the lower plate 604, and, while in a closed position of the mold, the top plate 606 may be in face-sharing contact with the lower plate 604. Each of the top plate 606 and the lower plate 604 may be square shaped and of equal size. In one example, the top plate 606 and the lower plate 604 may both be sized 440 mm×440 mm. The top plate 606 and the lower plate 604 may not include any holes such that, during the molding process, gases from within the mold may not escape. Unregulated escape of residual gases during the molding process may cause the final part to shrink and shrivel. The mold may be made of metal, polymer, and other conductive materials.

The lower plate 604 may include one or more cavities, wherein the material to be molded may be filled. In this example, the mold may include a first cavity 608 and a second cavity 610. The first cavity 608 may be shaped in the form of a sock liner for a left article of footwear while the second cavity 610 may be shaped in the form of a sock liner for a right article of footwear, the left and right articles of footwear belonging to the same pair (having a same article of footwear size). The depth of each of the first cavity 608 and the second cavity 610 may be equal. In one example, the depth of each cavity may be three times the thickness of the final part (such as the sock liner in this example). By increasing the depth of the cavities, spillage of filler material out of the mold during the temperature cycle may be reduced.

The top plate 606 may include one or more protrusions corresponding to each cavity. In this example, the top plate may include a first protrusion 612 and a second protrusion 614. The first protrusion 612 may correspond to the first cavity 608 and, upon placing the top plate 606 on the lower plate 604, the first protrusion may fit into the first cavity 608 without significant spacing between the walls (along planar surfaces) of the protrusion and the cavity. Said another way, the first protrusion 612 may be shaped and sized according to the first cavity 608 such that, upon closing the mold, the first protrusion 612 may uniformly exert pressure on the material filled into the first cavity 608. The height of the first protrusion 612 may be the same or higher than the depth of the first cavity 608. Similarly, the second protrusion 614 may correspond to the second cavity 610 and, upon placing the top plate 606 on the lower plate 604, the second protrusion 614 may fit into the second cavity 610 without significant spacing between the walls of the second protrusion 614 and the second cavity 610. Said another way, the second protrusion 614 may be shaped and sized according to the second cavity 610 such that, upon closing the mold, the second protrusion 614 may uniformly exert pressure on the material filled into the second cavity 610. The height of the second protrusion 614 may be the same or higher than the depth of the second cavity 610.

Each of the first cavity 608 and the second cavity 610 may be filled with material to be molded. As an example, chopped foamed material 616 and 618 may be used to fill the first cavity 608 and the second cavity 610, respectively. In one example, the cavities may include markings up to which the cavity may be filled. Each cavity in the mold may be filled with the same or similar material since the material is exposed to the same temperature cycle and pressure for processing. The cavities and the protrusions may not be textured to facilitate free flow of the material with the mold.

A gasket 622 may be positioned about the perimeter of the lower plate 604. Upon closing the lid of the mold such as upon placing the top plate 606 on the lower plate 604, the gasket 622 may seal the mold and restrict and/or completely block fluidic communication between inside and outside the mold. The gasket 622 may be placed close to the cavities to improve the sealing. Further, a thermocouple may be placed in close proximity to the cavities, such as in the space between the first cavity 608 and the second cavity 610. The material contained in the cavities may be heated by flowing current through wirings in channels formed in the mold.

Returning to FIG. 4, once the chopped material has filled the cavities in the mold, at 414, the mold may be closed and sealed via one or more gaskets, e.g., the gasket 622 of FIG. 6. In order to close the mold, a top plate of the mold may be placed on a lower plate of the mold including the filled cavities. The mold may be exposed to a heat cycle while sealed. The gasket may provide a sealing of the mold which inhibits the materials from inside the mold from seeping out of the mold during the temperature cycle. Closing of the lid of the mold may exert pressure on the material filling the cavity of the mold. By using a gasket to seal the mold, the pressure within the mold may be increased during heating of the cycle, and reduced during cooling of the cycle.

FIG. 7D shows another schematic example 740 of compression molding of the chopped foam pieces 735 in FIG. 7C obtained by cutting the scrap foam sheet. As described above, based on the desired dimensions (such as thickness) of the final product to be made out of the compressed foamed material, a weighed amount of chopped foam pieces 748 may be packed into a cavity 745 of a mold 741, which may have a seal surrounding cavity 745 (e.g., the double line surrounding cavity 745). Once the chopped foam pieces 748 are filled into the cavity 745 within a lower plate 746 of the mold 741, an upper plate 744 may be placed on the lower plate 746 such that a protrusion 742 on the upper plate 744 aligns with the cavity 745 and compresses the chopped foam pieces 748 filling the cavity 745.

Upon sealing, the mold may be exposed to a heat cycle, which may be a first part of a temperature cycle. In one example, the mold may be heated by flowing electric current though coils integrated into the mold structure and in a target location, such as close to the cavities. In another example, the mold may be heated by exposing the mold to a heated environment, such as by placing the mold within a heated oven. The heating of the mold may cause a phase change in the chopped foamed material loaded into the cavities. The mold may be heated to a threshold temperature at a constant or variable rate. In one example, the average temperature of the chopped foamed material may be tracked based on a thermocouple inserted into the mold and placed proximal to the cavities containing the chopped foamed material. In another example, the temperature of the chopped foamed material may be modeled based on an initial temperature of the mold and the chopped foamed material, a rate of heating, and properties (such as specific heat) of a material of the mold and the chopped foamed material.

At 418, the method includes determining if the temperature of the chopped foamed material has increased to an upper (first) threshold temperature. The upper threshold temperature may be in the range of 150° C. to 160° C. If it is determined that the upper threshold temperature has not been reached, at 420, the routine may wait for the mold to reach the upper threshold temperature before moving to the next step.

If it is determined that the upper threshold temperature is reached, at 422, after a threshold stabilization period, the mold is opened, such as the lid of the mold is lifted to allow residual gases to be released from within the mold. As an example, once it is determined that the upper threshold temperature is reached, the lid may be opened after a stabilization period of three to four mins. Due to the off-gassing, the pressure inside the mold may reduce to within a threshold of atmospheric pressure. In one example, the threshold of atmospheric pressure may be higher than the atmospheric pressure. In another example, the threshold of atmospheric pressure may be the atmospheric pressure. The rate at which the pressure is released from within the mold (venting) may affect the texture of the molded foamed material. A higher rate of pressure release may facilitate good adhesion between the pieces of foamed material and avoid shrinkage of the pieces of foamed material. By opening the lid of the mold for off-gassing, the pressure may be released at a higher rate relative to pressure release via one or more holes in the mold.

The residual gases released during this off-gassing step may be residual blowing agents remaining in the foamed material from the initial formation of the foamed material from PEBA. In one example, the lid of the mold may be held open until the pressure reduces to a threshold pressure (such as atmospheric pressure). In another example, the lid may be held open for a pre-determined duration to release the gas.

By releasing the pressure and residual gases at a lower rate, the adhesion between the individual pieces and/or the finishing of the molded foam article is improved. Pressure release and/or degassing allows the molded foam article to be formed in a way that the edges (perimeter) of the product are uniform and a trimming flange is neat. In one example, if the pressure is released at a lower rate, the foam pieces may bond during molding but subsequently shrink, and the exterior edges of the molded foam article may become somewhat concave rather than remaining flat, which in turn may create gaps when another component is placed in contact with or bonded to the molded foam article.

FIG. 9 shows images 900 of two molded foam articles formed from identical foam via the method 400 elaborated in FIG. 4. While forming first foamed article 902, pressure release upon the foamed material within the cavity of the mold reaching a threshold temperature is carried out at a first rate and, while forming second foamed article 904, pressure release upon the foamed material within the cavity of the mold reaching the threshold temperature is carried out at a second rate, the second rate higher than the first rate. By comparing the surface finish and the perimeter of the first foamed article 902 to that of the second foamed article 904, it may be inferred that, by releasing pressure at a higher rate, the surface finish of the molded foam article may be improved. Due to the slower pressure release, the surfaces of the first foamed article 902 have shrunk and are concave rather than flat.

Returning to FIG. 4, once the gases are released, at 424, the lid of the mold may be closed and the mold may be re-sealed. A cooling cycle may be started to cool off the compressed foamed material that is formed in the mold cavity. In another example, additional heating may continue for a period and then heat removed and cooling begun. In an example, cooling may include simply removing or stopping heating. In another example, active cooling may be used with a cooled medium, such as cooled airflow passing over the exterior of the mold.

In one example, after the release of the gases from the mold, the foamed material may be cooled to a temperature range of 20° C. to 35° C. In one example, the foamed material may be cooled by suspending flow of electricity (heat supply) through the mold and/or removing the mold from the heated environment, such as the oven. In another example, the mold may be cooled by actively flowing a coolant (such as water) through channels in and/or around the mold.

At 426, once the temperature of the foamed material reaches a desired lower (second) threshold temperature, the mold may be opened and the compressed foamed material may be removed from within the mold. The lower threshold temperature may be in the range of 20° C. to 35° C. However, other lower threshold temperatures may be used, such as in a range of 25° C. to 30° C.

FIG. 5 shows an example plot 500 of variation in a temperature during a temperature cycle. In an example, the temperature represents an average temperature among the pieces of foam in the mold. In one example, the temperature of the foamed material may be estimated based on a thermocouple inserted into the mold and placed proximal to the cavities of the mold containing the foamed material. In another example, the temperature of the foamed material may be modeled as a function of an estimated initial temperature of the mold and an estimated rate of heat input to the mold, and further based on specific heat coefficients of a material of the mold and the foamed material. The x-axis denotes time (in seconds) and the y-axis denotes temperature (in ° C.). The variation in the temperature is shown by the line 502, where the temperature may be an average temperature of the foamed material in the mold.

As the mold is heated, the temperature of the foamed material may gradually increase to a first threshold temperature T1. In this example, the first threshold temperature T1 is reached at time t1. After attainment of the first threshold temperature T1, the temperature may be stabilized for a threshold time duration from time t1 to t2.

At time t2, the lid of the mold may be opened to de-gas and release any residual gases from within the mold. From time t2 to t3, the mold is held open and the opening of the mold causes a drop in temperature. Once the residual gases have been released, the pressure inside the mold may reach atmospheric pressure. Following the release of the gases, at time t3, the mold may be resealed. Resealing the mold causes the remaining heat to be trapped within the mold, which results in the temperature increasing, causing a "bump" in the line 502. Active heating of the mold may be optionally continued until time t3.

The rate of change of temperature as a function of time is shown to scale in FIG. 5, and as illustrate the rate of temperature decrease between time t2 and t3 is 0.1-10, 0.5-1.5, or 0.9-1.1 degrees F. per second, inclusive of the end-points.

After time t3, the mold may no longer be actively heated and if the mold is present in a heated environment (such as in an oven), the mold may be removed from the heated environment. Once heating of the mold is discontinued, the temperature of the foamed material may decrease to a second threshold temperature T2 at t4, where the second threshold temperature T2 is lower than the first threshold temperature T1. Upon the material temperature decreasing to the second threshold temperature T2, the lid of the mold may be opened and the compressed foamed material may be removed from within the cavity of the mold.

Given that the cavity of the mold may be formed in the shape and size of the article of footwear component being manufactured, the compressed foamed material may be substantially formed as the article of footwear component. However, the edges of the compressed foamed material may not be smooth. In one example, the compressed foamed material may be primed with ultra violet (UV) light prior to being formed into the structure of interest. In another example, the compressed foamed material may not be primed via UV light or any other radiation. In this way, chopped pieces of foamed material may be heated and cooled to form a unitary layer without addition of any adhesive or additive. While specific temperature and pressure values are provided to illustrate the approaches described herein, variation may occur. As an example, the various numerical values may be approximate and vary within 5%.

FIG. 7E shows an example of a compressed molded foam sheet 760 removed from the mold after compression molding at an elevated temperature followed by release of residual gases and exposure to a cooling cycle. The compressed material may be in the shape of the cavity of the mold in which it was formed.

FIG. 8 shows an example of a sheet 800 of compressed foamed material as obtained after opening the mold post exposure to the temperature cycle. The sheet 800 may comprise the chopped foamed material 802 of the scrap foamed material fused together without the presence of any adhesive or binding agent. The boundary 804 of the chopped foamed material 802 may be visible in the sheet 800. The surface of the sheet 800 may be smooth without any shrinkages along the perimeter of the sheet 800. By chopping the foamed material in to smaller pieces prior to compression molding, holes and voids on the surface of the sheet 800 may be reduced, thereby improving surface density and cosmetic appeal.

Returning to FIG. 4, at 428, in one example, the compressed foamed material may be trimmed based on the application of the material. The trimming may be carried out by blades, thermocutting, or using a focused light source, such as a laser. In one example, if the compressed foamed material is formed for a sock liner, the compressed foamed material may be trimmed via blades in the shape of the sock liner. In another example, if the compressed foamed material is formed for a cushioning element housed between a midsole and an outsole, the compressed foamed material may be trimmed via blades in the shape of a cushioning element. In yet another example, if the compressed foamed material is formed for a core carrier, the compressed foamed material may be trimmed via blades in the shape of the core carrier. In addition to making article of footwear components, such compressed foamed material may also be used in other applications, including in helmets, apparel, body armor, seats, etc. The trimming of the compressed foamed material may not be carried out and the compressed foamed material may be directly used as a cushioning article. However, as noted above, in some examples, appropriate control of the un-sealing and re-sealing of the mold during the temperature cycle may enable the chopped foam pieces to form an article that does not require any trimming, thus saving labor and/or processing time.

FIG. 7F shows an example footwear component 780 prepared from the compressed, molded foamed material 752. The sheet 760 in FIG. 7E may be trimmed/cut/punched out via blades in the shape and form of the footwear component. In this example, a sock liner is shown to be formed out of the compressed, molded foamed material. In this way, FIGS. 7A-7F provide schematic processing steps carried out during repurposing of the scrap foamed material remaining after forming a piece of apparel. As described in the process above, scrap foamed material remaining after formation of a first apparel component may be compressed in a mold, and the compressed, molded foamed material from the mold may form a component of a second apparel component different from the first apparel component.

The compressed, molded foamed material may be characterized to determine the physical properties of the foamed material and then compared to the pristine foamed material initially used for making the article of footwear midsole. As an example, based on a series of characterization tests, it may be determined that a molded (compressed) foamed material may have a C/R in a range of 150% to 300%, and more particularly in a range of 175% to 250%, and even more particularly in a range of 190% to 210%, as examples. Molded (compressed) foamed material in these ranges may manifest specific gravity in a range of 0.5 to 0.3 $g/cm^3$ 0.1 to 0.2 $g/cm^3$, or 0.12 to 0.14 $g/cm^3$, as examples. Additionally, molded (compressed) foamed material in these ranges may provide a compression set of a maximum of 60-95%, 70-85%, or 78-82%, as examples. Further, molded (compressed) foamed material in these ranges may provide a, shrinkage of 0.1-5%, 0.5-1.5% or 1%, as examples. Molded (compressed) foamed material in these ranges may also provide a compression deflection (C/D) curve of 3-20 kgf, 5-15 kgf, or 9-14 kgf at 25% compression and 20-40 kgf, 25-35 kgf, or 27-33 kgf at 50% compression. Additionally, molded (compressed) foamed material in these ranges may provide a peak G (maximum gravitational force during the impact) of 5-35, 10-20, or 16-18, and/or energy loss during impact of 10-40%, 15-30%, or 24-26%.

Having described aspects of the present disclosure herein and in reference to the figures, the following provides addition and complimentary descriptions of the present disclosure that are described or illustrated in the figures.

The present disclosure provides for methods of forming molded foam articles in particular a single-piece molded foam article. A molding step includes molding a plurality of separate pieces of closed-cell foam into a single-piece molded foam article. This can be achieved by exposing the plurality of separate pieces to a temperature cycle within a sealed mold sufficient to soften the plurality of separate pieces without fully melting the closed-cell foam, and allow the plurality of separate pieces to physically bond to each other. During the temperature cycle, the sealed mold is unsealed at least once, releasing gases and/or pressure from the mold. Also, during the temperature cycle, an average temperature among the plurality of separate pieces reaches a minimum threshold temperature at which the closed-cell foam softens sufficiently for the plurality of pieces to physically bond together without adhesive. At least upon completion of the temperature cycle, the plurality of separate pieces are touching each other without any other component therebetween. During the temperature cycle, the plurality of separate pieces of closed-cell foam can expand in volume.

The single-piece molded foam article can be formed by physically bonding the softened plurality of separate pieces bonded together without an adhesive, and, following the releasing, removing the single-piece molded foam article from the mold. The mold can be unsealed by opening the mold, and then re-sealed upon closing the mold prior to removing the single-piece molded foam article from the mold. Opening the sealed mold includes, upon an average temperature of the plurality of separate pieces of the closed-cell foam reaching the minimum threshold temperature, stabilizing the temperature, and then opening the sealed mold, forming an unsealed mold. In addition, the method can include holding the unsealed mold open until a pressure within the unsealed mold reduces to within a threshold of atmospheric pressure and then closing the unsealed mold to re-seal the unsealed mold, forming a re-sealed mold, and cooling the plurality of separate pieces of the closed-cell foam in the mold to a second threshold temperature. The second threshold temperature lower than the minimum threshold temperature. Upon reaching the second threshold temperature, the re-sealed mold can be re-opened. The minimum threshold temperature is in a range of 150° C. to 160° C. and the second threshold temperature is in a range of 20° C. to 35° C. The pressure reduction to within the threshold of atmospheric pressure occurs at a rate faster than a pressure rise during heating of the temperature cycle.

The single-piece molded foam article can be trimmed into a shape and a size of a cushioning element of an article of footwear.

The method also includes sub-dividing one or more larger pieces of the closed-cell foam, forming the plurality of separate pieces. The plurality of separate pieces can be smaller in size than the one or more larger pieces. The sub-dividing the one or more larger pieces of the closed-cell foam can include splitting a first sheet of the closed-cell foam to form a second sheet of the closed-cell foam. The thickness of the second sheet of the closed-cell foam is at least 5% lower than a thickness of the first sheet of the closed-cell foam. The second sheet of the closed-cell foam can be vertically cut to a threshold length. The threshold length can be in a range of 4 to 10 cm. The method can include chopping the second sheet of the closed-cell foam of the threshold length into rectangular-prism-shaped pieces.

The amount of the plurality of pieces in the mold is based on one or more of a volume of the molded foam article, a specific gravity of the closed-cell foam, and a desired compression ratio of the single-piece molded foam article. The desired compression ratio is based on the molded foam article, the desired compression ratio ranging from 150% to 250%.

In an aspect, the sealed mold is free of an adhesive and/or the plurality of separate pieces are free of the adhesive.

The method can also include filtering the plurality of separate pieces by passing them through one or more filtering meshes to separate out pieces of a first size range. The first size range can be in a size range of 3 mm to 15 mm.

The method can also include, prior to or during the molding, drying the plurality of separate pieces at an elevated temperature above ambient temperature until a moisture content of the plurality of separate pieces reduces to below a threshold level.

The molding the plurality of separate pieces can include filling one or more cavities of the mold with an amount of the plurality of pieces, closing a lid of the filled mold, sealing the filled mold via a gasket, and exposing the sealed filled mold to the temperature cycle.

In another aspect, the present disclosure provides for methods that include exposing a filled, sealed mold filled with a plurality of separate pieces of foamed material to a heating cycle. At a threshold temperature, unsealing the filled, sealed mold until a pressure reduces to within a threshold of atmospheric pressure. The after unsealing, cooling the filled mold prior to removing a single-piece molded foam article from the mold. The cooling the filled mold can includes re-sealing the filled mold following the reduction of pressure, the method further comprising cooling the filled, sealed mold. The heating cycle can be carried out at a higher than atmospheric pressure.

The method also includes, after the pressure reduces to atmospheric pressure, resealing the filled mold and cooling the filled mold, and, upon reaching another threshold temperature, unsealing the filled mold to remove the compressed foamed material, the another threshold temperature lower than the threshold temperature.

The mold can include one or more cavities which are filled with an amount of chopped foamed material based on a compression ratio of the cushioning element. The chopped foamed material includes pieces with one or more sides having a largest dimension in a range of 1 mm to 50 mm, or in a range of 3 mm to 25 mm, or in a range of 8 mm to 15 mm, and wherein the compression ratio of the compressed foamed material is from 110-400%, or 125-300%, or 150%-250%.

The present disclosure also includes articles of manufacture such as a cushioning element including a single-piece molded foam article, where the single-piece molded foam article is an article made according to any of the methods described above or herein. The article of manufacture is one of an article of apparel, an article of footwear, an article of sporting equipment, a component of an article of apparel, a component of an article of footwear, or a component of an article of sporting equipment.

Specific Gravity Test Protocol

Specific gravity of the foamed material before or after molding (i.e., the foamed material of the plurality of pieces prior to being subjected to a molding process as described herein, and the foamed material of the molded foam article prepared using a molding process as described herein) is determined using the following test protocol. Three test specimens of the foamed material, each having a size of approximately 2.5 cubic centimeters (approximately 1 cubic inch), and each including only the foamed material, are prepared. If the dimensions of the article from which the specimen will be removed are sufficient to do so, three specimens of size approximately 2.5 centimeters×2.5 centimeters×2.5 centimeters are cut from three different areas of the foamed material. Alternatively, if the dimensions of the article from which the specimen is to be removed are not sufficient to allow three specimens of foamed material to be cut from a single article, a single specimen can be cut from each of three different articles. If the dimensions of the article are too irregular to allow preparation of a cubic sample, the dimensions of the specimen are chosen to allow preparation of a foamed material specimen having a total volume of approximately 2.5 cubic centimeters to be prepared from a single article. The initial dimensions of the specimen, including the length, width, and height of the specimen, are measured via a gauge and the weight of the specimen is determined using a balance. Specific gravity (S.G.) of each specimen of the foamed material is determined using the following formula:

$$S.G. = \frac{\text{Weight (g)}}{\text{Length (cm)} \times \text{Width (cm)} \times \text{Height (cm)}} \div 1.00 \text{ g/cm}^3.$$

Compression Set Test Protocol

Static compression set of the foamed material before or after molding is determined using the following standard test protocol. Five cylindrical test specimens of foamed material, each having a diameter of approximately 2.5 cm (about 1 inch) and a height of approximately 20 mm are prepared. If the dimensions of a single article from which the specimen is to be removed are not sufficient to allow preparation of a 20 mm high specimen, two or more specimens each having a diameter of approximately 2.5 cm and thicknesses of at least 5 mm can be stacked to achieve a stack height of approximately 20 mm. If the dimensions of a single article are not sufficient to allow preparation of a single specimen having a diameter of approximately 2.5 cm, multiple portions of molded foamed material can be arranged next to each other to create a compound sample having a total diameter of approximately 2.5 cm. The specimens are prepared at least one day before testing and are acclimatized in the laboratory where the test is to be performed for at least eight hours prior to conducting the test. The initial thickness (pre-compression) of each specimen is measured using a gauge prior to the test. During the test, the specimen is compressed in a compression device between two metal plates with flat parallel faces to a height of 50% of the specimen's original thickness. In the compression device, the metal plates can be held together by screws, and flat rings of standard thicknesses can be used to ensure the metal plates are held at the correct height to compress the specimen by 50% based on the total thickness of the specimen before compression. The compressed specimens are placed in a pre-heated oven at 50° C. for a duration of six hours. While in the oven, the compression device is placed sideways so that the compression of the specimen is not affected by gravity. After six hours inside the oven, the compression device is removed from the oven, and the plates of the compression device are separated (e.g., by loosening the screws holding them together) and the compressed specimen held between the plates is removed. The compressed specimen is cooled to room temperature (such as from 20° C. to 24° C.) for at least 30 minutes, and the final thickness (post-compression) of the compressed specimen is measured using a gauge. The static compression set is calculated using the following formula:

$$\% \text{ Set} = \frac{(\text{Initial Height (mm)} - \text{Final Height (mm)})}{(50\% \text{ of Initial Height (mm)})} \times 100.$$

Shrinkage Test Protocol

Shrinkage of the foamed material is determined before or after molding using the following standard test protocol. Five specimens of the foamed material having dimensions approximately the same as the dimensions of the foamed material which will be used in the final product (such as a midsole or a sock liner) are prepared. The initial length of each of the specimens (the longest dimension) is measured using a gauge. The specimens are then placed inside an oven preheated to 70° C., and the specimens are heated in the oven for 40 minutes. After 40 minutes, the specimens are then removed from the oven and cooled for 30 minutes at room temperature (such as from 20° C. to 24° C.). The final length (post-heating) of each specimen is again measured using the gauge. The percentage shrinkage in the length of each specimen is determined using the following formula:

$$\% \text{ Shrinkage} = \frac{(\text{Initial Length (mm)} - \text{Final Length (mm)})}{(\text{Initial Length (mm)})} \times 100.$$

Compression-Deflection Test Protocol

The compression-deflection (C/D) curve of the foamed material is determined before or after molding using the following test protocol. Five cylindrical foamed material specimens each having a thickness of at least 20 mm and a diameter of approximately 40 mm are prepared. If the specimen is removed from a cushioning element, the thickness of the specimen should correspond to the thickness of the actual cushioning element without skiving or cutting. The specimens are prepared at least one day before testing and are acclimatized in the laboratory where the test is to be performed for at least eight hours prior to conducting the test. An initial thickness of each specimen is measured via a gauge. Each specimen is then placed between the flat compression platens of an impact testing machine, such as an Instron system (Instron, Norwood, MA, USA). The crosshead speed is set to 10 mm/min. Based on the height of each specimen in millimeters, the number of millimeters of compression needed to result in 25% and 50% compression of the specimen is calculated. The specimen is centered beneath the crosshead on a non-deflecting lower platen, and the crosshead is slowly lowered until an upper platen just comes into contact with the top of the specimen. The specimen is then pre-loaded to 10.5 kilograms force, and the extension measurement is zeroed. The test is then run on the specimen with the crosshead set at 10 mm/min for each of the 25% and 50% compressions, and the force value at each point is recorded. The compression/deflection force determined for 25% compression and 50% compression for each specimen are reported in kilograms force (kgf). In addition to determining the force required to achieve 25% and 50% deflection of a specimen of the foamed material, this test protocol can also be used to determine a stress-strain curve for the specimen. The stress-strain curve can then in turn be used to calculate various cushioning characteristics of the specimen, such as the Peak G and/or energy loss. Standard software can be used to perform these calculations.

Impact Test Protocol

Cushioning characteristics of a foamed material specimen before or after molding, or of an article, such as a whole article of footwear or a component of an article of footwear, including a cushioning element, such as a midsole or sock liner, are determined using the following test protocol. Four specimens are prepared for testing. If the test is to be conducted on a foamed material specimen cut from a larger piece of the foamed material or on a foam plaque, the specimen is prepared to have a minimum thickness of at least 10 mm and a minimum length and width of approximately 80 mm. If the test is to be conducted on a whole article of footwear, an upper is removed from a sole structure, and the entire sole structure is used as the specimen. If the test is to be conducted on a midsole, the upper and an outsole are removed, and the entire midsole is used as the specimen. For footwear-shaped specimens (e.g., whole article of footwear specimens, whole midsole specimens, sock liner specimens, and the like), the impact locations for testing are determined by measuring a length of the specimen from the edge of a heel to the furthest point of a toe using a gauge, calculating 15% of the length and 70% of the length, and determining a point in the middle of the specimen 15% from the edge of the heel (impact location A) and a point in the middle of the specimen 70% from the edge of the heel (impact location B). If the specimen is a sock liner, the total length used is the internal length of an article of footwear in which the sock liner is used, rather than the length of the sock liner itself. The specimens are prepared at least one day before testing and are acclimatized in the laboratory where the test is to be performed for at least eight hours prior to conducting the test. To conduct the test, the specimen is clamped within a dynamic impact testing device such that each impact location is on a flat area within the middle of the specimen. The impact testing device is adjusted to drop a mass of 7.8 kg onto the specimen for 10 pre-conditioning cycles followed by 10 measured cycles, and to record a load and a displacement of the impactor tup during each impact. The load and displacement data are collected for each impact location, and standard software is used to create a load-deflection curve for the specimen, and to calculate the peak G (a measure of the maximum deceleration upon impact), the maximum penetration, the time to peak (from impact to maximum load), and the percent energy loss, where the energy loss is the energy lost during impact (as a percent), calculated by determining the percentage difference between the input energy and the output energy. Peak G is a measure of how "soft" or "firm" the cushioning effect is, with a lower peak G value indicating softer cushioning and a higher peak G indicating firmer cushioning. Energy loss is a measure of cushioning responsiveness based on the amount of energy dissipated on impact. A lower energy loss indicates more responsive cushioning, while a higher energy loss indicates less responsive cushioning.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1 percent to about 5 percent" should be interpreted to include not only the explicitly recited concentration of about 0.1 weight percent to about 5 weight percent but also include individual concentrations (e.g., 1 percent, 2 percent, 3 percent, and 4 percent) and the sub-ranges (e.g., 0.5 percent, 1.1 percent, 2.2 percent, 3.3 percent, and 4.4 percent) within the indicated range. The term "about" can include traditional rounding according to significant figures of the numerical value. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

What is claimed is:

1. A method for forming a cushioning element for an article of footwear, comprising:
    molding a plurality of separate pieces of closed-cell foam into a single-piece molded foam article by exposing the plurality of separate pieces to a temperature cycle within a sealed mold sufficient to soften the plurality of separate pieces without fully melting the closed-cell foam and allow the plurality of separate pieces to physically bond to each other, wherein, during the temperature cycle, the sealed mold is unsealed at least once, releasing gases and/or pressure from the mold, wherein unsealing the sealed mold includes, upon an average temperature of the plurality of separate pieces of the closed-cell foam reaching a minimum threshold temperature, stabilizing the average temperature, and then opening the sealed mold, forming an unsealed mold;
    holding the unsealed mold open until a pressure within the unsealed mold reduces to within a threshold of atmospheric pressure, and then closing the unsealed mold to re-seal the unsealed mold, forming a re-sealed mold, and cooling the plurality of separate pieces of the closed-cell foam in the mold to a second threshold temperature, the second threshold temperature lower than the minimum threshold temperature;
    forming the single-piece molded foam article by physically bonding the softened plurality of separate pieces bonded together without an adhesive, and, following the releasing, removing the single-piece molded foam article from the mold;
    wherein the single-piece molded foam article is the cushioning element for the article of footwear.

2. The method of claim 1, wherein, during the temperature cycle, an average temperature among the plurality of separate pieces reaches a minimum threshold temperature at which the closed-cell foam softens sufficiently for the plurality of pieces to physically bond together without adhesive.

3. The method of claim 1, wherein the mold is unsealed by opening the mold, and then re-sealed upon closing the mold prior to removing the single-piece molded foam article from the mold.

4. The method of claim 1, wherein the pressure reduction to within the threshold of atmospheric pressure occurs at a rate faster than a pressure rise during heating of the temperature cycle.

5. The method of claim 1 further comprising, upon reaching the second threshold temperature, re-opening the re-sealed mold.

6. The method of claim 1, wherein the minimum threshold temperature is in a range of 150° C. to 160° C. and the second threshold temperature is in a range of 20° C. to 35° C.

7. The method of claim 1, wherein molding the plurality of separate pieces includes filling one or more cavities of the mold with an amount of the plurality of pieces, closing a lid of the filled mold, sealing the filled mold via a gasket, and exposing the sealed filled mold to the temperature cycle.

8. The method of claim 1, wherein the closed-cell foam is a scrap foam remaining after forming another foam article different from the single-piece molded foam article.

9. The method of claim 1, wherein the component of an article of footwear is a sock liner.

10. The method of claim 1, wherein the component of an article of footwear is a midsole or a midsole component.

11. The method of claim 1, wherein the closed-cell foam is a foamed product of a thermoplastic resin comprising a thermoplastic elastomer chosen from one of a thermoplastic polyurethane elastomer, a thermoplastic polyester elastomer, a thermoplastic polyether elastomer, a thermoplastic polyamide elastomer, a thermoplastic copolymer thereof, or a thermoplastic mixture thereof.

12. The method of claim 11, wherein the closed-cell foam is a foamed and cross-linked product of a thermoplastic resin comprising a thermoplastic copolyamide.

13. The method of claim 1, wherein the closed-cell foam comprises a cross-linked foam.

14. The method of claim 1, wherein the closed-cell foam comprises a cross-linked polyamide elastomer.

15. The method of claim 14, wherein the cross-linked polyamide elastomer is a cross-linked copolyamide elastomer.

16. The method of claim 1, wherein the plurality of separate pieces of closed-cell foam include a plurality of separate pieces of a closed-cell cross-linked elastomeric foam, and the cross-linked elastomeric foam softens but does not fully melt during the temperature cycle.

* * * * *